(12) United States Patent
Miyakawa et al.

(10) Patent No.: US 8,815,376 B2
(45) Date of Patent: Aug. 26, 2014

(54) SURFACE TREATMENT AGENT FOR HYDRAULIC TRANSFER, AND HYDRAULIC TRANSFER METHOD AND HYDRAULIC TRANSFER PRODUCTS USING SAME

(75) Inventors: Kenichi Miyakawa, Shizuoka (JP); Shunichi Azuma, Shizuoka (JP)

(73) Assignee: Taica Corporation, Tokyo (JP)

( * ) Notice: Subject to any disclaimer, the term of this patent is extended or adjusted under 35 U.S.C. 154(b) by 0 days.

(21) Appl. No.: 13/996,353

(22) PCT Filed: Feb. 15, 2012

(86) PCT No.: PCT/JP2012/053484
§ 371 (c)(1),
(2), (4) Date: Jun. 20, 2013

(87) PCT Pub. No.: WO2012/114952
PCT Pub. Date: Aug. 30, 2012

(65) Prior Publication Data
US 2013/0280502 A1    Oct. 24, 2013

(30) Foreign Application Priority Data
Feb. 23, 2011  (JP) .................................. 2011-037294

(51) Int. Cl.
*C09D 123/00* (2006.01)
*C09D 123/26* (2006.01)
*C09D 123/28* (2006.01)
*B44C 1/175* (2006.01)

(52) U.S. Cl.
CPC ............ *C09D 123/28* (2013.01); *C09D 123/26* (2013.01); *B44C 1/1758* (2013.01)
USPC ..................... 428/195.1; 428/201; 428/423.1; 428/424.8; 156/308.6

(58) Field of Classification Search
USPC .......................... 428/195.1, 201, 423.1, 424.8; 156/308.6
See application file for complete search history.

(56) References Cited

U.S. PATENT DOCUMENTS 7,514,138 B2 *   4/2009  Ariga et al. ................. 428/195.1
2012/0321862 A1 * 12/2012  Ikeda et al. ................. 428/195.1

FOREIGN PATENT DOCUMENTS

JP   09-076700 A   3/1997
JP   10-035196 A   2/1998

(Continued)

OTHER PUBLICATIONS

International Search Report dated Apr. 24, 2012, issued in corresponding application No. PCT/JP2012/053484.

*Primary Examiner* — Elizabeth Mulvaney
(74) *Attorney, Agent, or Firm* — Westerman, Hattori, Daniels & Adrian, LLP

(57) ABSTRACT

A surface treatment agent for hydraulic transfer to perform hydraulic transfer decoration with high adhesion onto an olefin-type substrate with poor adhesion. They are provided by a surface treatment agent for hydraulic transfer to a polyolefin-type substrate to be used in a hydraulic transfer method for forming a decorative layer, by coating an activator to a dried print pattern on a water-soluble film to recover adhesion of said print pattern, and then by hydraulic transferring said print pattern onto the surface of a surface treatment layer of the polyolefin-type substrate treated with the surface treatment agent, characterized in that said surface treatment agent for hydraulic transfer is consisted of a resin composition including a modified polyolefin (a), a polyfunctional isocyanate (b) and a solvent (c), and a blending ratio of (b)/(a) is 0.005 to 0.5, in weight ratio.

16 Claims, 3 Drawing Sheets

(56) References Cited

FOREIGN PATENT DOCUMENTS

| JP | 2002-121462 A | 4/2002 |
|---|---|---|
| JP | 3395450 B | 4/2003 |
| JP | 2003-246020 A | 9/2003 |
| JP | 2006-035828 A | 2/2006 |
| JP | 3806737 B2 | 8/2006 |
| JP | 3881002 B2 | 2/2007 |
| WO | 2006/035708 A1 | 4/2006 |

* cited by examiner

SURFACE TREATMENT AGENT FOR HYDRAULIC TRANSFER, AND HYDRAULIC TRANSFER METHOD AND HYDRAULIC TRANSFER PRODUCTS USING SAME

TECHNICAL FIELD

The present invention relates to a surface treatment agent for hydraulic transfer, and a hydraulic transfer method and hydraulic transfer products using the same, and in more detail, the present invention relates to the surface treatment agent for hydraulic transfer, which is capable of hydraulic transfer decoration, provided with sufficient and sure adhesion, as well as high quality and mass productivity (productivity) for an object to be transferred composed of a polyolefin-type material with particularly poor adhesion•poor adhesiveness, among plastic-type materials with poor adhesion•poor adhesiveness; and a hydraulic transfer method and hydraulic transfer products using the same.

BACKGROUND ART

The hydraulic transfer method is a method for forming a decorative layer, by coating an activator, which is capable of making a print pattern in a fluidized state by dissolving or swelling said print pattern, onto the print pattern of a transfer film for hydraulic transfer, composed of a water-soluble film having a non-water soluble print pattern (print design) on the surface, after that, floating this transfer film for hydraulic transfer on water so that the print pattern surface becomes the upper surface side, and by pushing in a molded article of an object to be transferred, from the upper surface thereof, at a stage when the print pattern layer in a fluidized state is spread on water surface, to transfer the print pattern in a fluidized state and spread state, by utilizing hydraulic pressure; and such a hydraulic transfer method has already been known. In addition, the present applicant has proposed a hydraulic transfer method superior in adhesion of the decorative layer to the object to be transferred, and rubfastness, even not using a conventional topcoat, by coating an activator composed of a UV ray hardening-type composition, integrating ink for a print pattern and the above UV ray hardening-type composition, and then hardening using UV ray (for example, refer to PATENT LITERATURE 1, 2 or the like).

Here, the activator to be coated on the above transfer film for hydraulic transfer is not the one having such specifications that particularly limit a material of the object to be transferred, and practically, in view of quality such as adhesion or the like of the decorative layer, as the object to be transferred, such a resin substrate has been adopted that has easy adhesion and is superior in mass productivity (less defect occurrence), and thus, among plastic-type materials with poor adhesion•poor adhesiveness, a polyolefin-type material with particularly poor adhesion•poor adhesiveness has been a state difficult to be applied. That is, in the case where a material of the object to be transferred is non-polyolefin-type plastic, for example, an ABS resin, a polycarbonate resin, a polyvinylchloride resin, an acrylic resin or the like, a conventional activator is possible to form a practically satisfactory decorative layer with high adhesion, on the surface of a molded article, however, in the case where the material of the molded article is a polyolefin-type resin such as polyethylene, polypropylene, adhesion of the decorative layer transferred was extremely low, as compared with the above ABS resin or the like, and thus improvement of adhesion has conventionally been a problem.

To solve the above problem, such a method has conventionally been proposed that includes an adhesion furnishing component in the activator (for example, refer to PATENT LITERATURE 3).

In the above PATENT LITERATURE 3, as the activator called a primer, such an activator has been disclosed that is coated on the transfer film for hydraulic transfer dispersed with a binder resin composed of a graft-copolymer consisting of 5 to 50% by weight of an alkoxy-(poly)alkylene glycol-.mono(metha)acrylate, 5 to 50% by weight of a chlorinated polypropylene resin, and 0 to 90% by weight of a vinyl compound having a polymerizable unsaturated group, in an organic solvent.

However, because this activator includes the binder resin composed of a chlorinated polyolefin, a solvent such as toluene is essential to disperse the chlorinated polyolefin, and thus including of such a solvent in the activator has a problem of difficulty in adjustment of ink activation of the print pattern, and application of the activator including the chlorinated polyolefin, which has been known effective in view of adhesion to the polyolefin-type substrate, has not necessarily been superior in productivity.

In addition, in the case of using a UV ray hardening-type (UV) activator having a UV ray hardening-type composition as a component, in particular, as the activator, dissolving power of the UV ray hardening-type activator and the chlorinated polyolefin is poor, and additional addition of a solvent component to the UV ray hardening-type activator, aiming at dissolving the chlorinated polyolefin, not only makes difficult to adjust ink activation of the print pattern but also inhibits integration in perfect harmony of ink and the UV ray hardening-type activator component, resulting in being impossible to provide a decorative layer of a topcoat-less superior in adhesion and rubfastness, due to generation etc. of decrease in film strength or adhesion of the decorative layer after UV ray hardening, and thus it has not been applicable to a method where an adhesion improvement component is made present internally in the activator.

In addition, in the case of including an isocyanate component as an adhesion furnishing component, even when the addition to the activator is possible, a water-soluble film (usually polyvinylalcohol) of the transfer film for hydraulic transfer, and the isocyanate component react and generate a trouble in finishing of the decorative layer of the transfer products, such as causing residue removing of coating of the water-soluble film after transfer, therefore it was not enough to simply add the adhesiveness furnishing component to the activator.

Further, in any of the hydraulic transfer methods, in the case of applying the activator dedicated to the polyolefin-type substrate, each time when the object to be transferred changes from the olefin-type substrate to a non-olefin-type substrate (or in an opposite way thereof), exchange of the activator is required, which has also caused limitation of productivity.

In addition, in PATENT LITERATURE 4, there has been disclosed that, by using a protective coating film, where a hydroxyl group-containing resin composition obtained by graft-copolymerization of a chlorinated polypropylene-type resin and an acryl-polyol component consisting of cyclohexyl methacrylate, t-butyl methacrylate and hydroxyethyl methacrylate, is hardened by a polyisocyanate-type hardening agent, as the protective coating film onto the print pattern transferred, the protective coating film having superior adhesion can be obtained at both of the polypropylene-type resin molded article and the print pattern layer.

However, although the method for coating the protective coating film provides expectation of effect of adhesive holding of the print pattern to the substrate, due to enclosing the print pattern transferred together with the substrate by the protective coating film, it cannot be applied to the hydraulic transfer method not requiring the protective coating film (topcoat), as in PATENT LITERATURE 1 and PATENT LITERATURE 2 using the UV ray hardening-type activator having the UV ray hardening-type composition as a component, therefore, it has not been a method widely applicable to the hydraulic transfer method.

In addition, as another conventional method, there has been a method for forming a decorative layer by hydraulic transfer after forming the surface treatment layer (undercoat layer), by coating the surface treatment agent (what is called a primer agent) including the chlorinated polyolefin at the surface of an object to be transferred (for example, refer to PATENT LITERATURE 5).

In the above PATENT LITERATURE 5, there has been disclosed a method for forming a decorative layer which is hydraulic transferred at an undercoat layer surface by forming the undercoat layer using a coating material based on a two component urethane modified chlorinated polyolefin resin as a primer.

Such a chlorinated polyolefin-type primer has widely been used commonly without limiting to hydraulic transfer, and a reactive urethane-type or the like, which is obtained by reacting a polyol with isocyanate has been known (for example, refer to PATENT LITERATURE 6), however, in any of them, an undercoat layer formed generally has not a little tackiness (tackiness), which tends to catch dust or the like at the surface of the undercoat layer before a transfer step in such a state, therefore, there has been a problem in view of securing productivity (securing yield) or securing quality stability, such that work in a clean room is necessary for countermeasure thereof. In addition, as a method for decreasing tackiness of the undercoat layer, there is a heating treatment method of the undercoat layer, however, it has been a problem of cost increase and productivity decrease, caused by increase in the heating treatment step.

In addition, as still another conventional method, there are various methods such as conventional flame treatment, corona treatment, plasma treatment, ITRO treatment for forming a nano-level silicon oxide film at the surface of an object to be coated via oxidizing flame by flame burner, and the like, however, there has been a problem of productivity and cost increase, due to requirement of special equipment.

As described above, in order to solve a problem of improving adhesion between an object to be transferred composed of a polyolefin-type resin such as polypropylene, and a decorative layer having a print pattern transferred, various methods have been proposed, however, a method for decorating by hydrolytic transfer, with high adhesion, at the polyolefin-type substrate, which has generally poor adhesiveness, is still not sufficient.

Accordingly, a hydraulic transfer method, that is capable of hydraulic transfer decoration having high adhesion onto an olefin-type substrate, which is an object to be transferred with poor adhesion, and also has superior productivity, has been required.

CITATION LIST

Patent Literature

PATENT LITERATURE 1: JP No. 3806737
PATENT LITERATURE 2: JP No. 3881002
PATENT LITERATURE 3: JP-A-09-076700 (JP No. 3395450)
PATENT LITERATURE 4: WO2006/035708
PATENT LITERATURE 5: JP-A-2003-246020
PATENT LITERATURE 6: JP-A-2002-121462

SUMMARY OF INVENTION

Technical Problem

In view of the above conventional technical problems, it is an object of the present invention to provide a surface treatment agent for hydraulic transfer that is capable of performing hydraulic transfer decoration with high adhesion onto an olefin-type substrate, which is an object to be transferred with poor adhesiveness, in a hydraulic transfer method; and the hydraulic transfer method and hydraulic transfer products using the same.

Solution to Problem

The present inventors have intensively studied a way to solve the above-described problems and performed various investigations on methods for surface treatment of the polyolefin-type substrate to enhance adhesiveness of an olefin-type substrate, which is an object to be transferred with poor adhesion, in a hydraulic transfer method, and have surprisingly discovered that not by conventional flame treatment, corona treatment, plasma treatment, ITRO treatment for forming a nano-level silicon oxide film at the surface of an object to be coated via oxidizing flame by flame burner, nor by a treatment method with a surface treatment agent such as a conventional primer, by surface treatment of the polyolefin-type substrate using a specific surface treatment agent consisting of a resin composition containing a modified polyolefin (a), a polyfunctional isocyanate (b) and a solvent (c), as a surface treatment agent, the obtained surface treatment layer on the polyolefin-type substrate has superior adhesion between the polyolefin-type substrate and a decorative layer formed by hydraulic transfer, although being a very thin layer, and have thus completed the present invention, based on this knowledge.

That is, according to a first aspect of the present invention, there is provided a surface treatment agent for hydraulic transfer to a polyolefin-type substrate to be used in a hydraulic transfer method for forming a decorative layer, by coating an activator to a dried print pattern on a water-soluble film to recover adhesion of said print pattern, and then by hydraulic transferring said print pattern onto the surface of a surface treatment layer of the polyolefin-type substrate treated with the surface treatment agent, characterized in that said surface treatment agent for hydraulic transfer is consisted of a resin composition comprising a modified polyolefin (a), a polyfunctional isocyanate (b) and a solvent (c), and a blending ratio of the polyfunctional isocyanate (b) relative to the modified polyolefin (a) is 0.005 to 0.5, in weight ratio, (b/a).

In addition, according to a second aspect of the present invention, there is provided the surface treatment agent for hydraulic transfer, in the first aspect, characterized in that the modified polyolefin (a) is at least one kind selected from the group consisting of a chlorinated polyolefin ($a^1$), an acid modified polyolefin ($a^2$), and an acid modified chlorinated polyolefin ($a^3$).

Still more, according to a third aspect of the present invention, there is provided the surface treatment agent for hydraulic transfer, in the first aspect, characterized in that the polyfunctional isocyanate (b) comprises a bifunctional isocyanate ($b^1$) and/or a trifunctional isocyanate ($b^2$).

In addition, according to a fourth aspect of the present invention, there is provided the surface treatment agent for hydraulic transfer, in the third aspect, characterized in that the bifunctional isocyanate ($b^1$) is an aromatic diisocyanate.

Still more, according to a fifth aspect of present invention, there is provided the surface treatment agent for hydraulic transfer, in the third aspect, characterized in that the trifunctional isocyanate ($b^2$) is tris(isocyanatephenyl)thiophosphate or tris(isocyanatephenyl)methane.

In addition, according to a sixth aspect of the present invention, there is provided the surface treatment agent for hydraulic transfer, in the second aspect, characterized in that the modified polyolefin (a) is the acid modified polyolefin ($a^2$) and the polyfunctional isocyanate (b) is an aliphatic-type isocyanate.

Still more, according to a seventh aspect of the present invention, there is provided the surface treatment agent for hydraulic transfer, in any of the first to the sixth aspects, characterized in that the solvent (c) is at least one kind selected from toluene, xylene, cycloalkanes or esters.

On the other hand, according to an eighth aspect of the present invention, there is provided a hydraulic transfer method for forming a decorative layer, by coating an activator to a dried print pattern on a water-soluble film to recover adhesion of said print pattern, and then by hydraulic transferring said print pattern onto the surface of a surface treatment layer of the polyolefin-type substrate treated with the surface treatment agent, characterized in that said surface treatment agent is consisted of a resin composition comprising a modified polyolefin (a), a polyfunctional isocyanate (b) and a solvent (c), and a blending ratio of the polyfunctional isocyanate (b) relative to the modified polyolefin (a) is 0.005 to 0.5, in weight ratio, (b/a), and thickness of said surface treatment layer is 3 µm or less.

In addition, according to a ninth aspect of the present invention, there is provided the hydraulic transfer method, in the eighth aspect, characterized in that the modified polyolefin (a) is at least one kind selected from the group consisting of the chlorinated polyolefin ($a^1$), the acid modified polyolefin ($a^2$), and the acid modified chlorinated polyolefin ($a^3$).

Still more, according to a tenth aspect of the present invention, there is provided the hydraulic transfer method in the eighth aspect, characterized in that the polyfunctional isocyanate (b) comprises the bifunctional isocyanate ($b^1$) and/or the trifunctional isocyanate ($b^2$).

In addition, according to an eleventh aspect of the present invention, there is provided the hydraulic transfer method, in the tenth aspect, characterized in that the bifunctional isocyanate ($b^1$) is the aromatic diisocyanate.

Still more, according to a twelfth aspect of the present invention, there is provided the hydraulic transfer method, in the tenth aspect, characterized in that the trifunctional isocyanate ($b^2$ is tris(isocyanatephenyl)thiophosphate or tris(isocyanatephenyl)methane.

According to a thirteenth aspect of the present invention, there is provided the hydraulic transfer method, in the ninth aspect, characterized in that the modified polyolefin (a) is the acid modified polyolefin ($a^2$) and the polyfunctional isocyanate (b) is the aliphatic-type isocyanate in the ninth aspect.

In addition, according to a fourteenth aspect of the present invention, there is provided the hydraulic transfer method, in any of the eighth to the thirteenth aspects, characterized in that the solvent (c) is at least one kind selected from toluene, xylene, cycloalkanes or esters.

Still more, according to a fifteenth aspect of the present invention, there is provided the hydraulic transfer method, in the eighth aspect, characterized in that treatment with the abovementioned surface treatment agent is selected from wiping, spray coating or dipping treatment.

In addition, according to a sixteenth aspect of the present invention, there is provided a hydraulic transfer product, characterized by being formed by the hydraulic transfer method, in the eighth aspect.

The present invention relates to, as described above, the surface treatment agent for hydraulic transfer, and a hydraulic transfer method or the like, and preferable aspects thereof encompass the following:

(1) The surface treatment agent for hydraulic transfer, characterized in that it is employed so that thickness of the abovementioned surface treatment layer is 3 µm or less, in the first aspect.
(2) The surface treatment agent for hydraulic transfer, characterized in that the abovementioned resin composition does not include a polyol compound, in the first aspect.
(3) The hydraulic transfer method, characterized in that the treatment with the abovementioned surface treatment agent is performed during or after substrate cleaning such as degreasing of the polyolefin-type substrate, in the fifteenth aspect.

Advantageous Effects of Invention

The surface treatment agent for hydraulic transfer of the present invention, according to the above composition, exerts superior adhesion between the polyolefin-type substrate and a decorative layer formed by hydraulic transfer, although the surface treatment layer obtained on the polyolefin-type substrate is a very thin layer, when it is used as said surface treatment agent in a hydraulic transfer method for forming a decorative layer by coating an activator to a dried print pattern on a water-soluble film to recover adhesion of said print pattern, and then by hydraulic transferring said print pattern onto the surface of a surface treatment layer of the polyolefin-type substrate treated with the surface treatment agent.

In addition, the surface treatment agent for hydraulic transfer of the present invention exerts effect even when the surface treatment layer is thin, which requires less use amount of the surface treatment agent, and is thus possible to reduce cost.

In addition, the surface of the surface treatment layer formed onto the object to be transferred has extremely low tackiness which makes dust or the like little adhered, therefore is easy in quality control.

Still more, by coating the surface treatment agent for hydraulic transfer of the present invention in the step of the conventional wiping or air blow washing to clean the surface of object to be transferred, the step is not increased, as well as surface treatment is performed only at the object to be transferred, therefore a transfer film or an activator for hydraulic transfer for a non-olefin-type object to be transferred can be used as it is, which does not increase parts number, and still more does not require exchange of the transfer film or the activator by each object to be transferred, and thus exerts effect of superior productivity.

On the other hand, according to the hydraulic transfer method of the present invention, the obtained hydraulic transfer products are superior in adhesion between the polyolefin-type substrate and a decorative layer formed by hydraulic transfer, therefore superior design characteristics, productivity and low cost can be attained.

The present inventors guess as follows, by consideration of mechanism of action effect of the surface treatment agent for hydraulic transfer of the present invention.

We consider that the modified polyolefin (a) in the resin composition composing the surface treatment agent for hydraulic transfer of the present invention is a component contributing to adhesion expression, as well as the polyfunctional isocyanate (b) is a component having function for acting to the polyolefin-type substrate to immobilize it on the substrate surface, and still more the solvent (c) is a component for making possible to dissolve the modified polyolefin (a) component, as well as a component to make easy intrusion of the modified polyolefin (a) component into the surface of the polyolefin-type substrate by dissolving a polyolefin and swelling the surface of the polyolefin-type substrate. In addition, we consider that, for example, the modified polyolefin (a) bound to the polyolefin-type substrate and the polyfunctional isocyanate (b) immobilized at the substrate surface react, which acts also a mechanism of still more strengthening bonding between the polyolefin-type substrate and the modified polyolefin (a). And, by the synergistic effect of these three components, surprisingly, by surface treatment of the polyolefin-type substrate with using a specific surface treatment agent consisting of resin composition including a modified polyolefin (a), a multifunctional isocyanate (b) and a solvent (c), as surface treatment agent, surface treatment of the surface treatment layer obtained on the polyolefin-type substrate exerts superior adhesion between the polyolefin-type substrate and a decorative layer formed by hydraulic transfer, although being a very thin layer.

DESCRIPTION OF EMBODIMENTS

The surface treatment agent for hydraulic transfer of the present invention is a surface treatment agent for hydraulic transfer to a polyolefin-type substrate to be used in a hydraulic transfer method for forming a decorative layer, by coating an activator to a dried print pattern on a water-soluble film to recover adhesion of said print pattern, and then by hydraulic transferring said print pattern onto the surface of a surface treatment layer of the polyolefin-type substrate treated with the surface treatment agent, characterized in that said surface treatment agent for hydraulic transfer is consisted of a resin composition comprising a modified polyolefin (a), a polyfunctional isocyanate (b) and a solvent (c), and a blending ratio of the polyfunctional isocyanate (b) relative to the modified polyolefin (a) is 0.05 to 0.5, in weight ratio, (b/a). In addition, by surface treatment of the polyolefin-type substrate using the surface treatment agent for hydraulic transfer of the present invention, the surface treatment layer obtained on the polyolefin-type substrate exerts significant effect of superior adhesion between the polyolefin-type substrate and a decorative layer formed by hydraulic transfer, although being a very thin layer.

Explanation will be given in detail below on the surface treatment agent for hydraulic transfer, and the hydraulic transfer method and the hydraulic transfer products using the same or the like by each item.

1. The Surface Treatment Agent for Hydraulic Transfer

Figure 1:
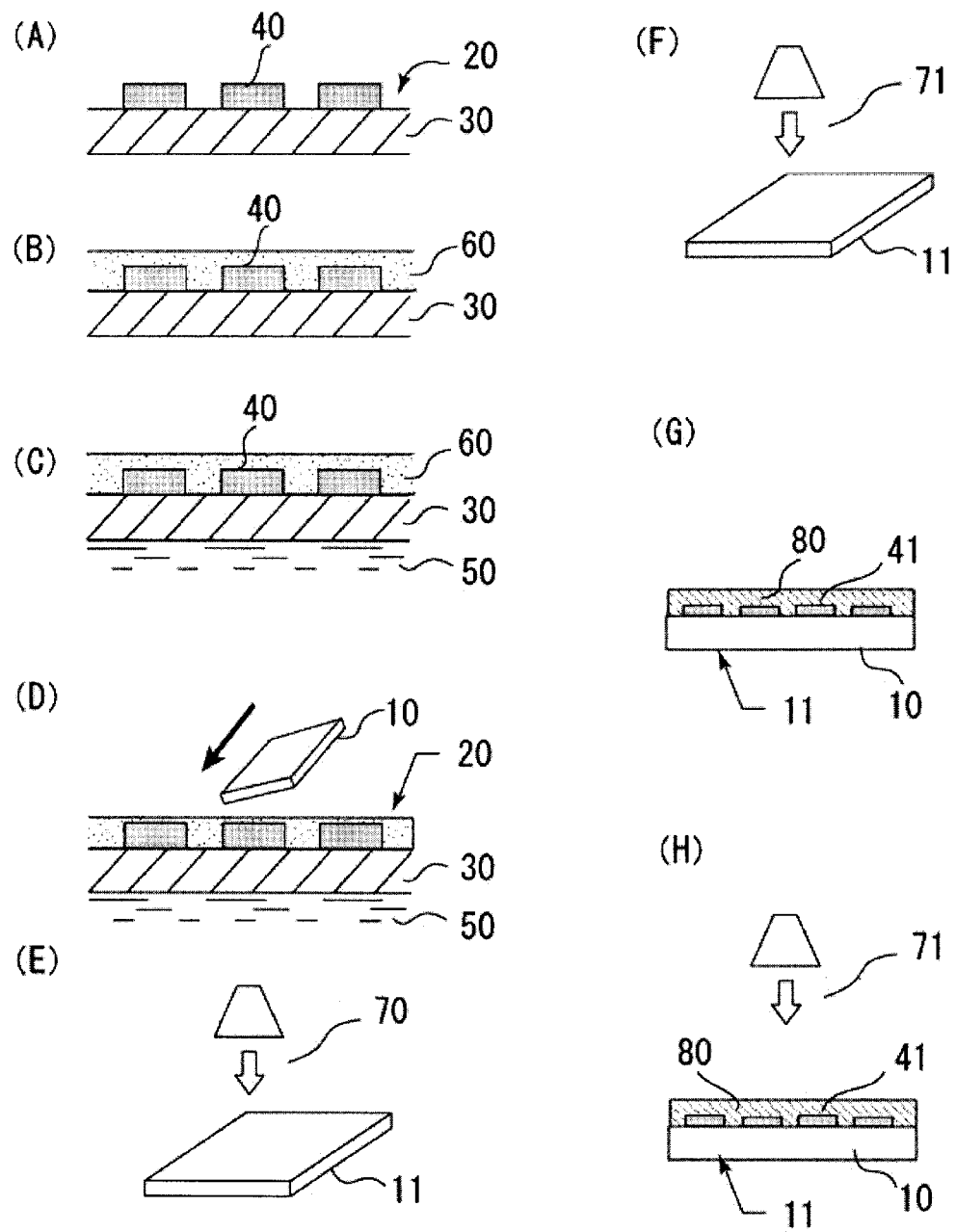
FIG. 1 is a drawing explaining outline of a hydraulic transfer method using a usual solvent-type activator.

In general, the hydraulic transfer method is, as described above, a method, that is, by coating an activator, which is capable of making a print pattern in a fluidized state by dissolving or swelling said print pattern, onto the print pattern of a transfer film for hydraulic transfer, composed of a water-soluble film having a non-water soluble print pattern (print design) on the surface, after that, floating this transfer film for hydraulic transfer on water so that the print pattern surface becomes the upper surface side, and by pushing in a molded article of an object to be transferred, from the upper surface thereof, at a stage when the print pattern layer in a fluidized state is spread on water surface, to transfer the print pattern in a fluidized state and spread state, by utilizing hydraulic pressure (refer to FIG. 1).

The surface treatment agent for hydraulic transfer of the present invention is used for surface treatment of the polyolefin-type substrate, which is the above object to be transferred, and is consisted of a resin composition containing a modified polyolefin (a), a polyfunctional isocyanate (b) and a solvent (c), and a blending ratio of the polyfunctional isocyanate (b) relative to the modified polyolefin (a) is 0.005 to 0.5, in weight ratio, (b/a).

(1) The Modified Polyolefin (a)

The modified polyolefin (a) used in the surface treatment agent for hydraulic transfer of the present invention is at least one kind selected from the group consisting of a chlorinated polyolefin ($a^1$), an acid modified polyolefin ($a^2$), and an acid modified chlorinated polyolefin ($a^3$). They may be used in combination of two or more kinds.

As the above chlorinated polyolefin ($a^1$), there is included a chlorinated polyethylene, a chlorinated polypropylene, a chlorinated polypropylene-ethylene copolymer, a chlorinated polyethylene-α-olefin copolymer or the like. Among them, the chlorinated polypropylene is preferable. In addition, content of chlorine is preferably 50% by mass or less, and the one having the content of chlorine of 10 to 45% by mass is more preferable. The content of chlorine of 50% by mass or less provides good adherence of the surface treatment layer to the polyolefin-type substrate.

Specifically, for example, as the chlorinated polyolefin ($a^1$), there is included "Hardlen 13L" (a chlorine content of 26%), "Hardlen 14LW" (a chlorine content of 27%), "Hardlen 15L" (a chlorine content of 30%), "Hardlen 16L" (a chlorine content of 32%), "Hardlen 15LLB" (a chlorine content of 30%), "Hardlen 14LLB" (a chlorine content of 27%), "Hardlen 14ML" (a chlorine content of 26.5%), and "Hardlen BS-40" (a chlorine content of 40%), produced by Toyobo Co., Ltd., or "Superchlon 832L" (a chlorine content of 27%), "Superchlon 773H" (a chlorine content of 32%), "Superchlon 803Mw" (a chlorine content of 29.5%), "Superchlon BX" (a chlorine content of 18%), and "Superchlon 206" (a chlorine content of 32%), produced by Nippon Paper Industries Co., Ltd., or the like.

In addition, the (meth)acrylic modified chlorinated polyolefin may be used as the chlorinated polyolefin ($a^1$). As the (Meth)acrylic modified chlorinated polyolefin, there is included, for example, a chlorinated polyethylene-(meth)acrylic copolymer, a chlorinated polypropylene-(meth)acrylic copolymer, or the like. Among them, the chlorinated polypropylene-(meth)acrylic copolymer is preferable.

The (meth)acrylic modified chlorinated polyolefin is the one in which the acid anhydride modified chlorinated polyolefin obtained by modifying the above chlorinated polyolefin with an anhydride such as maleic anhydride is reacted with a (meth)acrylic monomer or a polymer thereof, and as the (meth)acrylic monomer, the one including a (meth)acrylate monomer having a hydroxyl group such as 2-hydroxyethyl (meth)acrylate, or a (meth)acrylate monomer having a glicidyl group such as glicidyl(meth)acrylate is used. Mass ratio of the acid anhydride modified chlorinated polyolefin and the polymer composed of a (meth)acryl monomer (a (meth)acryl resin), in the (meth)acrylic modified chlorinated polyolefin is preferably 5 to 30:95 to 70 (100% by mass in total). In addition, content of the (meth)acryl monomer having a hydroxyl group or the (meth)acryl monomer having a glicidyl group, in the (meth)acryl resin is preferably 0.5 to 10% by mass.

In addition, as the above acid modified polyolefin ($a^2$), for example, a polypropylene resin modified with maleic anhydride or the like is included, and is not especially limited, as long as it is an acid modified polyolefin to be used in a coating composition or the like, and specifically includes trade names of "Superchlon 851L", "Superchlon 930", "Auroren 100S" or the like, produced by Nippon Paper Industries Co., Ltd.

Still more, the above acid modified chlorinated polyolefin ($a^3$) can be obtained, for example, by graft-copolymerizing at least one kind selected from α,β-unsaturated carboxylic acid and an anhydride thereof to a raw material polyolefin, and then by blowing chlorine gas in a solvent. In addition, it can be obtained by chlorinating the raw material polyolefin, and then by graft-copolymerizing at least one kind selected from α,β-unsaturated carboxylic acid and an anhydride thereof.

As the raw material polyolefin, there can be exemplified a propylene-type polyolefin such as crystalline polypropylene, amorphous polypropylene and a propylene-ethylene copolymer, and they can be used alone or in combination of two or more kinds. Among them, crystalline propylene such as isotactic polypropylene, syndiotactic polypropylene is preferable, and isotactic polypropylene is more preferable.

As an α,β-unsaturated carboxylic acid or an acid anhydride thereof to be graft-copolymerized to a raw material polyolefin or a chlorinated polyolefin, there is included, for example, maleic acid, maleic anhydride, itaconic acid, itaconic anhydride, fumaric acid or the like. Among them, the acid anhydride is preferable and maleic anhydride is more preferable. Amount to be graft-copolymerized is preferably 1 to 10% by weight, and more preferably 1 to 6% by weight.

For graft copolymerization, after dissolving a raw material polyolefin or chlorinated polyolefin into an aromatic organic solvent such as toluene, xylene, or heat-melting without using a solvent, at least one kind selected from the α,β-unsaturated carboxylic acid and the acid anhydride thereof is reacted under presence of a radical generating agent.

As the radical generating agent to be used in the graft copolymerization reaction, there is included, for example, peroxides such as di-tert-butyl peroxide, tert-butyl hydroperoxide, dicumyl peroxide, benzoyl peroxide, methyl ethyl ketone peroxide.

As acid modified chlorinated polypropylene, which is an exemplification of the acid modified chlorinated polyolefin ($a^3$), there is included "Hardlen CY9122" (a chlorine content of 22%), "Hardlen F-2" (a chlorine content of 20%), "Hardlen F-6" (a chlorine content of 20%), produced by Toyobo Co., Ltd., or the like, as a graft polymerization-type, and as other than the graft copolymerization-type, there is included, "Superchlon 822" (a chlorine content of 25%), produced by Nippon Paper Industries Co., Ltd., or the like as a terminal acid modified-type.

(2) The Polyfunctional Isocyanate (b)

The polyfunctional isocyanate (b) to be used in the surface treatment agent for hydraulic transfer of the present invention is a compound having two or more isocyanate groups (—NCO) in a molecule, and is also called a polyisocyanate compound.

As the polyisocyanate compound, there is included a polyisocyanate compound having an unreacted isocyanate group, or a blocked polyisocyanate compound in which the isocyanate group in the polyisocyanate compound is blocked by a blocking agent, or the like, and the one from a usual aromatic type, aliphatic type and alicyclic type can be included.

In the present invention, the above polyfunctional isocyanate (b) includes a bifunctional isocyanate ($b^1$) of diisocyanates and/or a trifunctional isocyanate ($b^2$) of triisocyanates. In addition, the polyfunctional isocyanate (b) may be a tetra or more functional isocyanate such as tetra isocyanates.

The bifunctional isocyanate ($b^1$) of diisocyanates includes, for example, an aromatic polyisocyanate such as tolylene diisocyanate(TDI), xylylene diisocyanate(XDI), tetramethyl xylylene diisocyanate(TMXDI), isopropylbenzene-2,4-diisocyanate, 1,5-naphthalene diisocyanate, methylene diisocyanate, 1,4-tetramethylene diisocyanate, 1,6-hexamethylene diisocyanate, 2,2,4-trimethylhexamethylene diisocyanate, lysine diisocyanate, 2,4,4-trimethylhexamethylene diisocyanate, dodecane diisocyanate, isophorone diisocyanate(IPDI), 4,4-dicyclohexylmethane diisocyanate, methylcyclohexane diisocyanate, 1,4-cyclohexyl diisocyanate, hydrogenated diphenylmethane diisocyanate, hydrogenated tolylene diisocyanate, hydrogenated xylylene diisocyanate, hydrogenated tetramethyl xylylene diisocyanate, 4,4'-diphenylmethane diisocyanate(MDI), 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, butane-1,4-diisocyanate; an aliphatic polyisocyanate; an aliphatic-aromatic polyisocyanate (polyisocyanate in which an isocyanate group is bound with an aromatic ring via an aliphatic hydrocarbon, that is, polyisocyanate having no isocyanate group directly bound to the aromatic ring in the molecule); or an alicyclic polyisocyanate compound; an isocyanate terminated compound obtained by reacting excess amount of these isocyanate compound with ethylene glycol, propylene glycol, trimethylol propane, hexane triol, or castor oil or the like.

In addition, as the tri-functional isocyanate ($b^2$) of the polyfunctional isocyanate (b), there is included triisocyanate such as lysine ester triisocyanate, 1,6,11-undecane triisocyanate, 1,8-diisocyanate-4-isocyanatemethyloctane, 1,3,6-hexamethylene triisocyanate, bicycloheptane triisocyanate, tris(isocyanatephenylmethane), tris(isocyanatephenyl)thiophosphate; and among them, an aromatic triisocyanate such as tris(isocyanatephenyl)methane, tris(isocyanatephenyl)thiophosphate having the chemical structure shown in the following formula 1 is preferable. In addition, when non-yellowing is required, it is preferable to use an aliphatic triisocyanate.

Still more, as the tetra-functional isocyanate, an organic tetra isocyanate such as 4,4'-dimethyldiphenylmethane-2,2', 5,5'-tetraisocyanate, dodecyltetraisocyanate, 1,2,5,7-tetraisocyanatenaphthalene can be applied. In addition, as a tetra or more-functional isocyanate, there is included, for example, a commercially available product such as "DuranateMF-B80M" (a hexafunctional isocyanate compound of hexamethylene diisocyanate type), produced by Asahi Kasei Chemicals Corporation.

[Chemical formula 1]

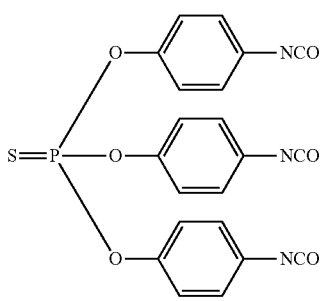

Formula 1

(3) The Solvent (c)

The resin composition as the surface treatment agent for hydraulic transfer of the present invention contains a solvent (c) other than a modified polyolefin (a) and a polyfunctional isocyanate (b).

As the solvent (c), it is not especially limited as long as it is component capable of dissolving the above modified polyolefin (a), or the polyolefin-type substrate, polyfunctional isocyanate (b), for example, toluene, xylene, cycloalkanes (such as methylcycloalkane, ethylcycloalkane), or esters [acrylic acid ester (butyl acrylate or the like), acetic acid ester (ethyl acetate, butyl acetate or the like), or the like], dichloromethane can be exemplified, and they may be used alone or in plural combination, and among them, an aromatic solvent such as toluene, xylene is preferable.

In addition, in view of decreasing environmental load, cycloalkanes (methylcycloalkane, ethylcycloalkane), or esters (butyl acrylate or the like) is preferable.

It should be noted that the resin composition may be prepared, after separately dissolving each compound in a different solvent, by mixing these solutions obtained, or the resin composition may be prepared by adding and dissolving each compound in one solvent.

(4) The Resin Composition

The resin composition composing the surface treatment agent for hydraulic transfer of the present invention consists of a resin composition including a modified polyolefin (a), a polyfunctional isocyanate (b) and a solvent (c), and a blending ratio of the polyfunctional isocyanate (b) relative to the modified polyolefin (a) is 0.005 to 0.5, in weight ratio, (b/a). It should be noted that the resin composition composing the surface treatment agent for hydraulic transfer of the present invention is the one not requiring a polyol compound usually to be used in a urethane resin composition, as an essential component.

Blending ratio of the polyfunctional isocyanate (b) is 0.005 to 0.5, in weight ratio (b/a), relative to the modified polyolefin (a), preferably 0.01 to 0.2, and more preferably 0.02 to 0.1. The weight ratio (b/a) below 0.005 of the polyfunctional isocyanate (b) relative to the modified polyolefin (a) provides too low polyfunctional isocyanate (b), which makes difficult to obtain superior adhesion between the polyolefin-type substrate and a decorative layer derived from co-action with the modified polyolefin (a), while the weight ratio (b/a) over 0.5 provides small ratio of the modified polyolefin (a), which also could not provide sufficient adhesion between the polyolefin-type substrate and the decorative layer, or could cause gelation of the surface treatment agent itself for hydraulic transfer in storage of the surface treatment agent for hydraulic transfer. Accordingly, in the present invention, in order to obtain superior adhesion between the polyolefin-type substrate and the decorative layer, it is very important that the blending ratio of the modified polyolefin (a) and the polyfunctional isocyanate (b) is in a range of the above weight ratio.

The polyfunctional isocyanate (b) having the more functional groups provides the higher adhesion between the polyolefin-type substrate and the decorative layer due to co-action with the modified polyolefin (a), however, even only the bifunctional isocyanate ($b^1$), it is possible to obtain the adhesion, therefore, in view of cost or the like, the bifunctional isocyanate ($b^1$) and the trifunctional isocyanate ($b^2$) can be applied alone or in combination, respectively.

A preferable combination example of the modified polyolefin (a) and the polyfunctional isocyanate (b) is described, specifically as follows: as the first example, the modified polyolefin (a) is the chlorinated polyolefin ($a^1$) or the acid modified chlorinated polyolefin ($a^3$), and the polyfunctional isocyanate is an aromatic polyfunctional isocyanate, wherein the aromatic polyfunctional isocyanate is composed of an aromatic diisocyanate and/or an aromatic trifunctional isocyanate. As the abovementioned aromatic trifunctional isocyanate, in particular, tris(isocyanatephenyl)thiophosphate or tris(isocyanatephenyl)methane still more enhances adhesion between the polyolefin-type substrate and the decorative layer.

In addition, as the second example, in view of reducing environmental load, in the case where it is preferable that chlorine is not included in the modified polyolefin (a), a combination that the modified polyolefin (a) is the acid modified polyolefin ($a^2$), and the polyfunctional isocyanate (b) is the aliphatic polyfunctional isocyanate is effective. By adopting this combination, not only adhesion in an equivalent to the case applied an aromatic isocyanate as the polyfunctional isocyanate (b) can be secured, but also there is no smell specific to an aromatic group, as compared with the case of coating an aromatic isocyanate, therefore environmental load can be decreased. In addition, because yellowing which is observed in an aromatic isocyanate can also be decreased, also in the case where concealability of the transfer pattern, in which a print pattern of the transfer film was transferred to the polyolefin-type substrate, is small (including a transparent state), a phenomenon visually confirmed as change of color of the transferred pattern by yellowing of the treated surface due to the surface treatment agent for hydraulic transfer can also be decreased, which is effective also in view of quality maintenance of the hydraulic transfer products.

In addition, as the solvent (c), application of cycloalkanes such as ethylcyclohexane instead of toluene or xylene having large environmental load, still more contributes to reduction of environmental load, and is thus preferable.

Still more, content of the solvent (c) is not especially limited, and it is adjusted, as appropriate, so as to attain concentration of the resin composition containing a modified polyolefin (a) and a polyfunctional isocyanate (b) suitable for coating property of the surface treatment agent for hydraulic transfer, or easiness in thickness adjustment of the surface treatment layer, and it is preferable that concentration of the abovementioned resin composition is set in a range of 0.1 to 5% by weight, relative to the whole surface treatment agent for hydraulic transfer.

It is because the concentration below 0.1% by weight could not provide adhesion between the polyolefin-type substrate and the decorative layer, due to too low concentration of the resin component, and too thin thickness of the surface treatment layer, while the concentration over 5% by weight makes difficult to attain uniform coating, due to increase in viscosity of the surface treatment agent for hydraulic transfer, as well as induces material failure of the surface treatment layer itself, due to too thick surface treatment layer, resulting in that adhesion between the polyolefin-type substrate and the coated layer could decrease.

The resin composition as the surface treatment agent for hydraulic transfer of the present invention has the above-described modified polyolefin (a), polyfunctional isocyanate (b) and solvent (c) as essential components, however, may include arbitrary additive components within a range not to impair effect of the present invention. For example, in order to enhance adhesion, a small amount of polyol component may be added.

2. The Hydraulic Transfer Method

The hydraulic transfer method of the present invention is a hydraulic transfer method for forming a decorative layer, by coating an activator to the above-mentioned print pattern transferred film for hydraulic transfer having a dried print pattern on a water-soluble film to recover adhesion of said print pattern, and then by hydraulic transferring said print pattern onto the surface of a surface treatment layer of the polyolefin-type substrate treated with the surface treatment agent, and characterized in that said surface treatment agent consists of a resin composition containing the modified polyolefin (a), the polyfunctional isocyanate (b) and the solvent (c), and a blending ratio of the polyfunctional isocyanate (b) relative to the modified polyolefin (a) is 0.005 to 0.5, in weight ratio, (b/a), and thickness of said surface treatment layer is 3 μm or less.

Explanation will be given below in detail on the hydraulic transfer method, however, the above surface treatment agent is the (abovementioned) surface treatment agent for hydraulic transfer of the present invention, and this detailed explanation is as described above.

(1) The Polyolefin-type Substrate

In the hydraulic transfer method of the present invention, the polyolefin-type substrate is used as a molded article, which is an object to be transferred.

The above polyolefin-type substrate is not especially limited, and there is included an olefin-type resin such as an ethylene-type resin, a propylene-type resin, an ethylene-vinyl acetate copolymer (EVA), and it may be a resin made of these resins alone or in a composite form of a plurality of them (by polymerization or a polymer alloy), or a composite resin between the olefin-type resin and other than the olefin-type resin.

The above ethylene-type resin is not especially limited, as long as it is the one usable as a molded article, including, for example, an ethylene homopolymer, or a copolymer of ethylene and α-olefin containing 50% by weight or more ethylene, or the like. This α-olefin includes, for example, propylene, 1-butene, 1-pentene, 1-hexene, 4-methyl-1-pentene, 1-heptene, 1-octene or the like.

In addition, as the above propylene-type resin, it is not especially limited, as long as it is the one usable as a molded article, there is included, for example, an propylene homopolymer, or a copolymer of propylene and α-olefin containing 50% by weight or more propylene. This α-olefin includes, for example, ethylene, 1-butene, 1-pentene, 1-hexene, 4-methyl-1-pentene, 1-heptene, 1-octene or the like.

In addition, such one may be applicable where known additives (for example, an antioxidant, a light stabilizer, a lubricant, a coloring agent and the like) are added to the polyolefin-type substrate, beginning with a reinforcing agent such as talk, and fillers.

(2) The Transfer Film for Hydraulic Transfer

The transfer film for hydraulic transfer relevant to the present invention is formed in a dry state by printing, coating or the like so that a predetermined print pattern layer becomes 0.1 to 100 μm, usually 1 to 10 μm, using a non-water-soluble component on a water-soluble or water-swelling supporting film (water-soluble film) with a thickness of about 5 to 300 μm.

The water-soluble film to be used in the above transfer film for the hydraulic transfer is not especially limited, and may be the water-soluble one or the water-swelling one. As the material thereof, there is included polyvinyl alcohol, polyvinylpyrrolidone, acetylcellulose, polyacrylamide, cellulose acetate butyrate, gelatin, glue, sodium alginate, hydroxyethyl cellulose, carboxymethyl cellulose or the like. In addition, it may be the one having these components as main components, and the one copolymerized with other monomer such as (meth)acrylamide, or the one having blended with other resins such as a polyurethane resin.

In addition, the abovementioned printed patter is printed on the water-soluble film by gravure printing, off-set printing, flexographic printing, ink jet printing or the like, however, this printed pattern includes also a plain printed layer other than a pattern in a strict meaning. In addition, as ink forming the print pattern, transparent ink may be applied so as to attain the transparent one at a part or the whole part.

(3) The Activator

As the activator to be used in the present invention, a known activator such as a conventional solvent-type activator, an activation energy ray hardening-type activator can be applied.

(i) The Activation Energy Ray Hardening-type Activator

As the activation energy ray hardening-type activator, explanation will be given below on the activation energy ray hardening-type activator to be used in the hydraulic transfer method (for example, refer to the abovementioned PATENT LITERATURE 1, 2 or the like) superior in adhesion of the decorative layer and the polyolefin-type substrate, or rubfastness of the decorative layer, even not using a conventional topcoat, by hardening by activation energy ray after integrating ink of a print pattern and, for example, a UV ray hardening-type composition.

The above activation energy ray hardening-type activator has a photo-polymerizable monomer and a photo-polymerization initiator as essential components, and still more added with a photo-polymerizable prepolymer to secure coating film characteristics after hardening, and it is preferable to have a composition containing, for example, the following constituents:

(1) a photo-polymerizable prepolymer: 0 to 70% by weight
(2) a photo-polymerizable monomer: 20 to 95% by weight
(3) a photo-polymerization initiator: 0.5 to 10% by weight It should be noted that the above photo-polymerizable monomer is a component contributing to fluidity of the activator and ink activation of the print pattern, and it is more preferable to be a bifunctional monomer, and it is still more preferable that 0 to 30% by weight thereof is a polyfunctional monomer.

As a specific example of the bifunctional monomer, there is included the known one such as dipropylene glycol diacrylate, 1,6-hexanediol diacrylate, tripropylene glycol diacrylate, PEG600 diacrylate, PO modified neopentyl glycol diacrylate, modified bisphenol A diacrylate, epoxidized bisphenol A diacrylate, tricyclodecane dimethanol diacrylate, PEG400 diacrylate, tetraethylene glycol diacrylate, triethylene glycol diacrylate, polyethylene glycol diacrylate, and they may be used alone or in plural combination.

In the present invention, as the bifunctional monomer, 1,6-hexanediol diacrylate, cyclohexyl acrylate, dipropylene glycol diacrylate is preferable and in consideration of permeability and dissolving power to ink, and still more suitable SP value, 1,6-hexanediol diacrylate and dipropylene glycol diacrylate are preferable.

In addition, as the polyfunctional monomer, a known substance may be applicable, however, a tetrafunctional monomer is capable of still more enhancing strength of the decorative layer. As a specific component of the tetrafunctional monomer, there is included pentaerythritol tetraacrylate, pentaerythritol ethoxy tetraacrylate, ditrimethylolpropane tetraacrylate or the like, however, known ones can be used as long as they are capable of providing effect of the present invention.

In addition, if needed, the additives of the following (4) to (6) may be included in the following ratio relative to the total of the above (1) to (3), as a non-reactive component to be added, and still more, a solvent may be added in a range of characteristics (dissolving power) and the addition amount not to inhibit activation of the print pattern by the photopolymerizable monomer of the activation energy ray hardening-type resin composition.

(4) a non-reactive resin: 2 to 12% by weight
(5) a light resistance furnishing agent: UV-A: 0.5 to 8% by weight and/or HALS: 1.5 to 3.5% by weight
(6) a leveling agent: 0.01 to 0.5% by weight (ii) The Solvent-type Activator The solvent-type activator is a solvent-type composition including, for example, a resin component, a solvent component and a plasticizer component as essential components, and this composition may still more include fine particulate silica.

The abovementioned resin component is the one for securing initial adhesion between ink composing the print pattern, and the polyolefin-type substrate, which is the object to be transferred, as well as for preventing diffusion of ink, and can be any one of or may combine a plurality of, for example, (1) various oil and fats such as linseed oil, soybean oil, synthetic drying oil, (2) a natural resin such as rosin, hardened rosin, rosin ester, polymerized rosin, (3) a synthetic resin such as a phenolic resin, a rosin modified phenolic resin, a maleic acid resin, an alkyd resin, a petroleum resin, a vinyl resin, an acrylic resin, a polyamide resin, an epoxy resin, an aminoalkyd resin, a fluorocarbon resin, (4) a cellulose derivative such as nitrocellulose, cellulose acetate butyrate resin, ethylcellulose, (5) a rubber derivative such as chlorinated rubber, cyclic rubber, and (6) other resin component such as casein, dextrin, zein (refer to the above PATENT LITERATURE 4). Among these, an short-oil alkyd resin is preferable and a combination of this with cellulose acetate butyrate (CAB) is more preferable.

In addition, the abovementioned solvent component is the one for securing tackiness of ink till completion of transfer of the print pattern layer by dissolving ink of the print pattern, and a known solvent component to be used in a conventional solvent-type activator composition can be adopted.

(4) The Treatment Method of a Surface Treatment Agent onto the Polyolefin-type Substrate The surface treatment agent can be used as it is or by diluted. In the case of dilution, the diluent is not especially limited, as long as it does not inhibit dispersion of resin components such as the modified polyolefin (a) or the polyfunctional isocyanate (b) in the surface treatment agent, however, it is preferable to use a solvent having the same component as the solvent (c) of the surface treatment agent, or solubility equivalent thereto. In addition, in the case where the solvent (c) of the surface treatment agent is toluene, such specifications may be adopted that decrease environmental load by dilution with a cycloalkane such as ethylcyclohexane, or an acetic acid ester such as ethyl acetate, butyl acetate, in a range not to impair dispersibility of the resin components.

The surface treatment method with the surface treatment agent onto the polyolefin-type substrate is not especially limited, and a known method is used, and the treatment with the surface treatment agent is selected, for example, from wiping, spray-coating or dipping treatment.

On the other hand, in the hydraulic transfer method of the present invention, the surface treatment layer is characterized to have a thickness of 3 µm or less, preferably 0.01 µm or more, and more preferably in a range of 0.1 to 1 µm. This is because the thickness of the surface treatment layer over 3 µm may decrease adhesion in some cases, while also the case of too thin thickness of the surface treatment layer (for example, below 0.01 µm, although it differs by a kind of the polyolefin-type substrate) tends to decrease adhesion.

It should be noted that reason for decreasing adhesion between the polyolefin-type substrate and the decorative layer in the case where thickness of the surface treating agent is over 3 µm, is considered that the surface treatment layer itself generates material failure, before failure (peeling) of interface between the surface treatment layer and the decorative layer, or interface between the surface treatment layer and the polyolefin-type substrate, as one factor.

Here, thickness of the surface treatment layer is a value measured by cross-section observation using SEM. Thickness of the surface treatment layer is adjusted by concentration and coating amount of the resin component such as the modified polyolefin (a) or the polyfunctional isocyanate (b) in the surface treatment agent. For example, in the case of decreasing thickness of the surface treatment layer, it is enough to perform coating by decreasing resin concentration, on the contrary, in the case where of increasing thickness of the surface treatment layer, it is enough to increase coating amount by increasing the resin concentration, or by decreasing the resin concentration within a range allowing coating.

In addition, the treatment with the surface treatment agent is not especially limited, as long as it is before hydraulic transfer, however, it is preferable to be performed during or after substrate cleaning such as degreasing of the polyolefin-type substrate.

Explanation will be given below on a specific method of the treatment method with the above surface treatment agent.

The above wiping treatment is, for example, a method for wiping up or rubbing the polyolefin-type substrate, by wetting a suitable amount of the surface treatment agent with Kimwipe or the like.

In addition, the above spraying treatment is a method for coating the surface treatment agent onto the polyolefin-type substrate by spraying the surface treatment agent. In addition, the surface treatment agent of the present invention is not required to leave as a thick coating layer at the surface of the polyolefin-type substrate, therefore the surplus surface treatment agent may be removed by air blowing after spray coating, as well as a solvent component may be volatilized and dried. As a spray coating apparatus, a known apparatus can be applied.

Still more, the above dipping treatment is a method for dipping the polyolefin-type substrate into a tank of the surface treatment agent, and then performing air blow. Dipping time can be adjusted, as appropriate, however, it is preferably about 5 to 30 seconds.

It should be noted that in any of the above methods, a solvent volatilizes quickly, therefore, special drying treatment such as heating is not required, however, drying by heating may be performed, as needed.

In addition, the treatment of the surface treatment agent may be performed by a wet-on-wet coating procedure, as needed, as long as it is within the above thickness range of the surface treatment layer.

(5) The Hydraulic Transfer Method

Explanation will be given below on the hydraulic transfer method of the present invention with reference to a method using the activation energy ray hardening-type activator (for example, an activator composed of the UV ray hardening-type composition) (for example, refer to PATENT LITERATURE 1 and 2) (refer to FIG. 2), however, it is not limited to this.

That is:

(i) An activator 61 containing the activation energy ray hardening-type composition, such as a UV ray or electron beam hardening-type resin composition, is coated at the print pattern surface of a transfer film 21 for hydraulic transfer, having a print pattern 40 in a dried state, on a base film 30 made of a PVA-type film.

(ii) After the transfer film for the abovementioned hydraulic transfer swelled to a in a range of swelling times of 110 to 170%, by floating the abovementioned transfer film 61 for hydraulic transfer on water 50 of a transfer bath at 25 to 40° C., so that the print pattern layer of the transfer film 61 for hydraulic transfer becomes the upper surface side, the print pattern is transferred onto the surface of the polyolefin-type substrate 10, by pushing a polyolefin-type substrate 10 surface treated as above, which is an object to be transferred, from the upper surface thereof, and by adhering the transfer film for the above hydraulic transfer to the polyolefin-type substrate 10 by hydraulic pressure.

It should be noted that ink in the print pattern and the activation energy ray hardening-type composition in the activator are integrated, in perfect harmony, till hydraulic transfer is performed onto the object to be transferred of the above (i) and (ii) (for example, in FIG. 2(D), a state 46 that ink in the print pattern 40 and the activation energy ray hardening-type composition in the activator 61 are in a perfect harmony, on the transfer film for hydraulic transfer before transfer.

(iii) A decorative layer 47 having a transfer pattern, where ink in the print pattern and the activation energy ray hardening-type composition in the activator are in a perfect harmony state, is formed at the surface of the above object to be adhered, by taking out the polyolefin-type substrate 12 adhered with the abovementioned transfer film for the hydraulic transfer, from a transfer bath, irradiating activation energy ray 72 such as UV ray or electron beams onto the outer surface of the abovementioned transfer film for the above hydraulic transfer to harden the abovementioned print layer, and then water washing and removing a base film with a water shower 70, and then drying with warm air 71.

It should be noted that as the activation energy ray hardening-type activator other than the UV ray or electron beams hardening-type activator, a visible light hardening-type or a gamma-ray hardening-type activator can be used, however, as the activation energy ray hardening-type activator, particularly the UV ray hardening-type activator is suitable. As a UV ray source, the solar ray, a low pressure mercury lamp, a high pressure mercury lamp, an ultrahigh pressure mercury lamp, a carbon arc lamp, a metal halide lamp, a xenon lamp or the like are used.

3. The Hydraulic Transfer Products

Figure 3:
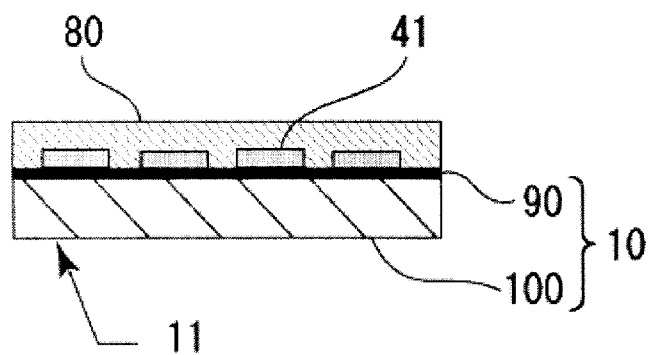
FIG. 3 is a schematic cross-sectional view in a thickness direction of a hydraulic transfer product of the present invention coating a hydraulic transfer method using a solvent-type activator.
Figure 4:
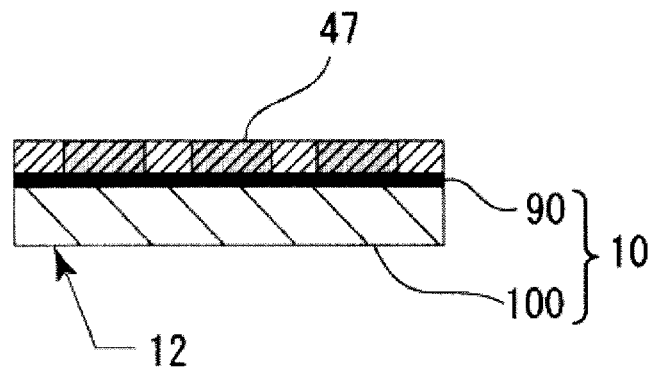
FIG. 4 is a schematic cross-sectional view in a thickness direction of a hydraulic transfer product of the present invention coating a hydraulic transfer method using an activation energy ray hardening-type activator.

The hydraulic transfer products obtained by the hydraulic transfer method of the present invention is superior in adhesion between the polyolefin-type substrate and a decorative layer formed by hydraulic transfer, therefore superior design characteristics, productivity and low cost can be attained, because of having a composition (for example, refer to FIG. 3, FIG. 4 or the like) where the polyolefin-type substrate and the decorative layer formed by hydraulic transfer are adhered via the surface treatment layer treated with the above surface treatment agent for hydraulic transfer.

In addition, the hydraulic transfer products obtained by the hydraulic transfer method of the present invention are widely applicable to a printing method for patterns in exterior parts of a mobile phone, various electric appliances, construction materials, household articles daily commodities and the like, beginning with interior and exterior automotive goods.

EXAMPLES

Explanation will be given below in more specifically on the present invention with reference to Examples, however, the present invention should not particularly be limited to these Examples.

It should be noted that in Examples and Comparative Examples, performance relating to the hydraulic transfer method or the like was evaluated in accordance with the following evaluation methods. In addition, surface treatment agents, substrates etc. used are shown below.

1. Evaluation Methods (1) Evaluation of tackiness of the surface treatment layer polyolefin-type substrate was opened indoor for 1 day to adhere naturally indoor dust, and when the surface adhered with the dust was air blown to remove electricity, and in observing the dust visually, evaluation was made as follows: a state within 10 pieces of the dust per 1 square cm is ○, and a state over 10 pieces is x.

(2) Evaluation of Adhesion (An Adhesion Test)

The decorative layer side of a test piece was subjected to a cross-cut test (in accordance with the former JIS K5400-8.5) to measure number of squares peeled off, and evaluated by the next standards:

Five pieces or less: ○ (good)

Six to ten pieces: Δ (within a practical use range)

Eleven pieces or more: x (bad)

(3) Thickness of the Surface Treatment Layer

A test piece after surface treatment was sliced to thin fragments in a thickness direction of the surface treatment layer using an ultra microtome (EM UC6, manufactured by Leica Co., Ltd.) and coated with Au (7 nm) and Pt (3 nm) at the cross-section to be observed, and thickness was measured using an electron microscope (JSM-7001F, manufactured by JEOL Ltd.) in a magnification of 6000 to 10000 amplification.

2. Materials (1) The Modified Polyolefin (a)

The acid modified chlorinated polypropylene, chlorinated polypropylene, and acid modified polypropylene described in Table 1 were used. It should be noted that A/C1, A/C2 and Ch in Table 1 each shows a dispersed state in toluene with a solid content of 20% by weight, as well as A/C3 and AM each shows a solid (a solid content of 100% by weight).

TABLE 1

| Mark | Kind of modification | Product name | Manufacturer |
|---|---|---|---|
| A/C1 | Acid modification and chlorination | Hardlen CY9122 | Toyobo Co., Ltd. |
| A/C2 | Acid modification and chlorination | Superchlon 822 | Nippon Paper Industries Co., Ltd. |
| Ch | Chlorination | Superchlon 803Mw | Nippon Paper Industries Co., Ltd. |
| A/C3 | Acid modification and chlorination | Hardlen CY9122P | Toyobo Co., Ltd. |
| AM | Acid modification | Auroren 100S | Nippon Paper Industries Co., Ltd. |

(2) The Polyfunctional Isocyanate (b)

Bifunctional to hexafunctional isocyanates described in Table 2 were used.

TABLE 2

| Mark | No. of functional group | Component | Product name | Manufacturer |
|---|---|---|---|---|
| A | 3 | tris(isocyanatephenyl) thiophosphate | Desmodur RFE | Sumika Bayer Urethane Co., Ltd. |
| B | 3 | tris(isocyanatephenyl)methane | Desmodur RE | Sumika Bayer Urethane Co., Ltd. |
| C | 3 | hexamethylene diisocyanate (biuret type) | Duranate 24A-100 | Asahi Kasei Chemicals Corp |
| D | 3 | hexamethylene diisocyanate (isocyanurate type) | Duranate TPA-100 | Asahi Kasei Chemicals Corp |
| E | 3 | hexamethylene diisocyanate (adduct type) | Duranate P301-75E | Asahi Kasei Chemicals Corp |
| F | 2 | 4,4'-diphenylmethane diisocyanate (MDI) | Lupranate MI | BASF INOAC Polyurethan Co., Ltd. |
| G | 2 | isocyanate terminated urethane prepolymer | NeoHardener F | Ikkaku Industry Co., Ltd. |
| H | 2 | hydrogenated diphenylmethane diisocyanate | Desmodur W | Sumika Bayer Urethane Co., Ltd. |
| I | 6 | oxime blocked product of HMDI-type hexafunctional isocyanate | Duranate MF-B80M | Asahi Kasei Chemicals Corp |

(3) The Solvent (c)

Toluene (TL), xylene (Xyl), ethylcyclohexane (ECH) and butyl acetate (Bu-Ac) were used.

Examples 1 to 28 and Comparative Examples 1 to 3

1. Preparation of Stock Solution of the Surface Treatment Agent for Hydraulic Transfer Resin solutions (stock solutions of the surface treatment agent for hydraulic transfer) made by dissolving resin compositions in solvents were obtained by mixing the modified polyolefin (a) of Table 1 and the polyfunctional isocyanate (b) of Table 2 together with the solvent (c), so as to attain blending ratios of Tables 3 to 6, and stirring so as to attain a uniform state.

It should be noted that as for the modified polyolefin, A/C1, A/C2 and Ch, each of the solvent components included in advance was mixed as it is.

In addition, in Tables 3 to 6, total of the modified polyolefin (a) and the polyfunctional isocyanate (b) was called "solid content", and weight ratio (% by weight) of the abovementioned solid content of the abovementioned surface treatment agent for hydraulic transfer occupying in total stock solution was defined solid content concentration of the stock solution.

In addition, in Comparative Examples 1 to 3, resin solutions (stock solutions of the surface treatment agent for hydraulic transfer) made by dissolving resin compositions in solvents were obtained by mixing the modified polyolefin A/C1 of Table 1 and the polyfunctional isocyanates A and F of Table 2 together with the solvent (toluene), so as to attain blending ratios of Table 6, and stirring so as to attain a uniform state. It should be noted that as for the modified polyolefin, A/C1, the solvent component contained in advance was mixed as it is.

Comparative Example 1 has a composition not including the polyfunctional isocyanate (b), and Comparative Examples 2 and 3 each has a composition of below the lower limit and over the upper limit of weight ratio of the polyfunctional isocyanate (b) relative to the modified polyolefin (a), respectively.

2. Implementation of Surface Treatment

The surface treatment layer was formed by using a commercial polypropylene plate (Toyota Super Olefin Polymer "TSOP-5", with a size of 100 mm×100 mm×3 mm thickness, produced by Toyota Motor Corp.; (TSOP is a registered trade name)), as the polyolefin-type substrate, which is an object to be transferred, and by coating the abovementioned surface treatment agent for hydraulic transfer as a surface treatment agent, at the surface forming a decorative layer of the abovementioned polyolefin-type substrate, by the next coating methods (i) to (iv).

It should be noted that the surface treatment agent to be used here was used by diluting the stock solution of the surface treatment agent for hydraulic transfer prepared in each Example, using the same solvent as the solvent blended in each Example, in dilution times shown in Tables 3 to 6. It should be noted that the abovementioned dilution was performed, provided that dilution times is N times, by adding a dilution solvent of (N−1) relative to 1 of stock solution. In addition, concentration of the abovementioned solid content after dilution is weight ratio (% by weight) of the abovementioned solid content occupying in the whole surface treatment agent for hydraulic transfer after dilution (it is obtained by dividing solid content concentration of the stock solution with dilution times). It should be noted that only in Example 2, dilution was performed using butyl acetate (Bu-Ac). Thickness of the surface treatment layer was adjusted by dilution times.

(i) Wiping 1 g of the surface treatment agent was impregnated into 1 piece of waste cloth made of paper [product name: Kimwipe (registered trade name), manufactured by Japan Paper Crecia Co., Ltd.], which was held with a pair of bamboo tweezers to wipe lightly the surface of the polyolefin-type substrate with a hand. At nearly the same time as wiping, the solvent component volatilized to form a surface treatment layer.

(i) Spray Coating

The surface treatment agent was coated in a ratio of 0.3 to 1 g/m² in response to thickness of a surface treatment layer to be formed, using a spray apparatus (PG-3L, manufactured by Anest Iwata Corp.), and dried naturally to form the surface treatment layer.

(ii) Air Blow after the Spray Coating

In (ii), by blowing off the surface treatment agent coated, using an air gun just after coating, as well as by volatilizing and removing the solvent component, the surface treatment layer was formed.

(iii) Dipping+Air Blow

After dipping the polyolefin-type substrate for 5 seconds in the surface treatment agent, by pulling it up, and by blowing off the surface treatment agent adhered at the polyolefin-type substrate, using an air gun, as well as by volatilizing and removing the solvent component, the surface treatment layer was formed.

It should be noted that, in Tables 3 to 6, the above (i) to (iv) were each written as Coating (i), Coating (ii), Coating (iii), and Coating (iv).

3. Hydraulic Transfer

Decorative layers were formed by each hydraulic transfer by a hydraulic transfer method (a system not having a topcoat layer) using the UV ray hardening-type activator in Examples 1 to 27, Comparative Examples 1 to 3, and Comparative Examples 4 to 8 to be shown next, and by a hydraulic transfer method (a system having a topcoat layer) using the solvent-type activator in Example 28.

(I) Hydraulic Transfer by a System of the UV Ray Hardening-Type Activator (Written as UV in Tables 3 to 7)

Figure 2:
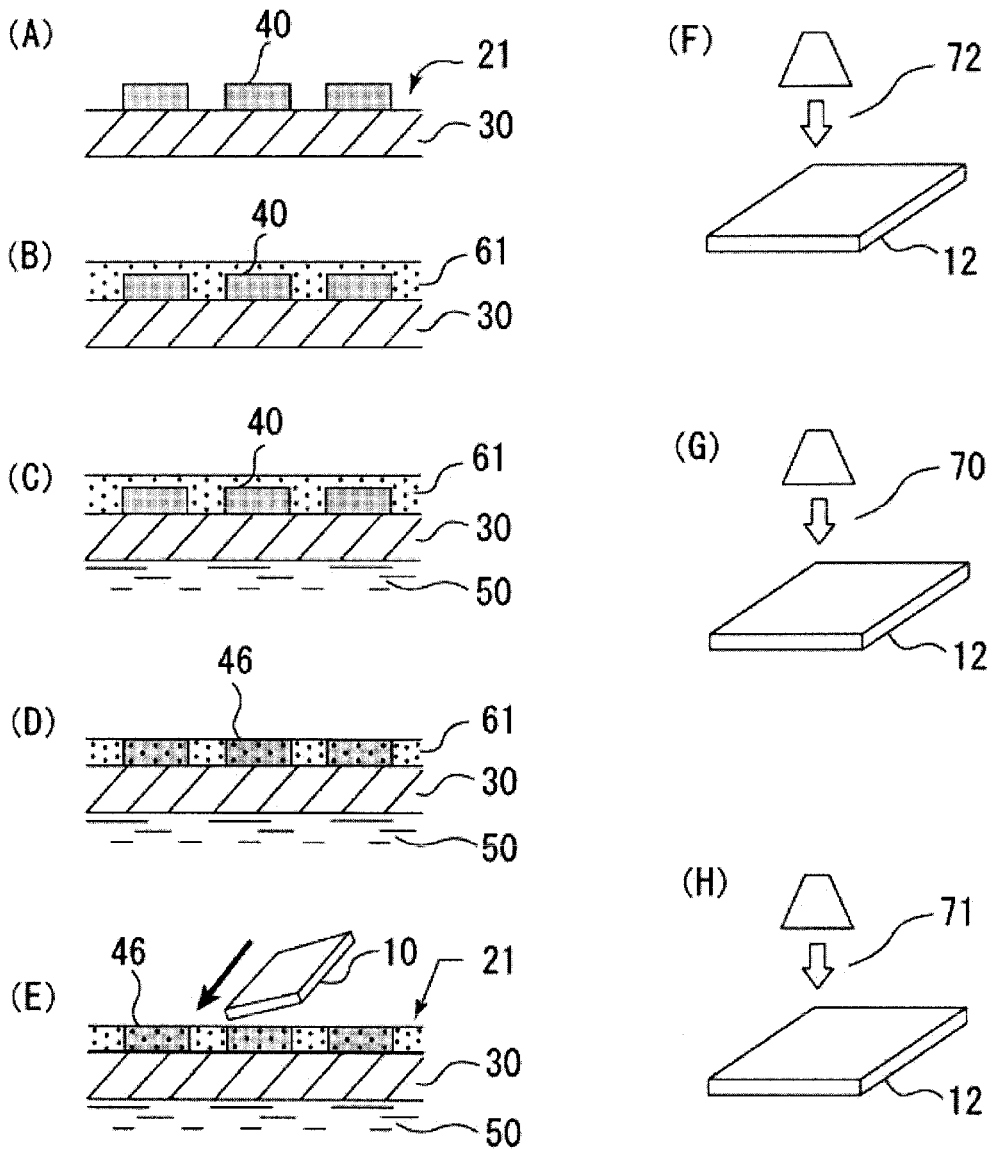
FIG. 2 is a drawing explaining outline of a hydraulic transfer method using an activation energy ray hardening-type activator.

In order to reproduce ink adhesion of the transfer film for hydraulic transfer, decorative layers having predetermined patterns were formed on the polyolefin-type substrate formed with the surface treatment layer using the surface treated agent by the hydraulic transfer method shown in FIG. 2, using a non-solvent-type UV ray hardening resin composition called a trade name of "Ubic S clear-HE", produced by Ohashi Chemical Industries Ltd., as the UV ray hardening-type activator, and coating in a thickness of 10 µm on a print pattern of the transfer film for hydraulic transfer, so as to reproduce ink adhesion of the transfer film (E02-EZ010 PL MAHO R 4C, manufactured by Taica Corp.) for hydraulic transfer by this UV ray hardening-type composition, as well as to integrate ink and the UV ray hardening-type resin composition, in perfect harmony. It should be noted that UV hardening conditions were set as follows: peak intensity: 300 [mW/cm²], and integrated light quantity: 2300 [mJ/cm²], using an A-type metal halide lamp (MAN800NL, manufactured by GS Yuasa Power Supply Corp.).

(II) Hydraulic Transfer by a System of the Solvent-Type Activator (Written as NOR in Tables 3 to 7)

In order to reproduce ink adhesion of the transfer film for hydraulic transfer, decorative layers having predetermined patterns were formed, by coating CPA-H produced by Taica Corp., as the activator, in a thickness of 10 µm on a print pattern of the transfer film, by reproducing ink adhesion of the transfer film (product name: Circle Check Carbon Black 1C (OP), produced by Taica Corp.) by this activator, and by transferring the print pattern on the polyolefin-type substrate formed with the surface treatment layer using the surface treated agent by the hydraulic transfer method shown in FIG. 1, and after water washing, drying and then by performing a topcoat.

The topcoat was spray coated in a thickness of 25±5 µm, using "PG9940", produced by Fujikura Kasei Co., Ltd., and then formed by heating hardening.

Comparative Example 4

A decorative layer was formed on the polyolefin-type substrate without surface treatment by hydraulic transfer by a system of the UV ray hardening-type activator, similarly as in Examples 1 to 28.

Comparative Example 5

A decorative layer was formed on the polyolefin-type substrate, similarly as in Comparative Example 4, except that a commercial two component urethane-type primer ("Acrydic CL-408" and "Burnock DN-980", produced by DIC Co., Ltd., were adjusted in a weight ratio of 2:1) was coated on the polyolefin-type substrate, as a primer A in table 7, and then drying to form the primer layer with a thickness of 10 µm.

Comparative Examples 6 to 7

A decorative layer was formed on the polyolefin-type substrate, similarly as in Comparative Example 5, except that thickness of the primer layer after drying in Comparative Example 5 was set at 3 µm, and 0.5 µm, respectively.

Comparative Example 8

A decorative layer was formed on the polyolefin-type substrate, similarly as in Comparative Example 6, except by using "Coatax LG-570" (a dispersed liquid in a solvent of a copolymer of an acryl-type monomer and a chlorinated polypropylene), produced by Toray Industries, Inc., as a primer B in Table 7 in Comparative Example 6.

Outline and evaluation results of the above Examples 1 to 28 and Comparative Examples 1 to 8 are shown in Tables 3 to 7.

TABLE 3

| | | | Example 1 | Example 2 | Example 3 | Example 4 | Example 5 | Example 6 | Example 7 | Example 8 |
|---|---|---|---|---|---|---|---|---|---|---|
| | Hydraulic transfer method | | UV | UV | UV | UV | UV | UV | UV | UV |
| (a) Modified polyolefin | | Material | A/C2 | A/C1 | A/C1 | A/C1 | A/C1 | A/C1 | Ch | AM |
| | | Added amount (wt. part) | 19.4 | 19.4 | 19.4 | 19.4 | 19.4 | 19.4 | 19.4 | 7.25 |
| (b) Multifunctional isocyanate | trifunctional | Material | A | A | B | C | D | E | A | A |
| | | Added amount (wt. part) | 0.5 | 0.5 | 0.5 | 0.5 | 0.5 | 0.5 | 0.5 | 0.375 |
| | bifunctional | Material | F | F | F | F | F | F | F | F |
| | | Added amount (wt. part) | 0.5 | 0.5 | 0.5 | 0.5 | 0.5 | 0.5 | 0.5 | 0.375 |
| | tetra or more-functional | Material | — | — | — | — | — | — | — | — |
| | | Added amount (wt. part) | — | — | — | — | — | — | — | — |
| | | wt. ratio to (a) | 0.05 | 0.05 | 0.05 | 0.05 | 0.05 | 0.05 | 0.05 | 0.10 |

TABLE 3-continued

|  |  |  | Example 1 | Example 2 | Example 3 | Example 4 | Example 5 | Example 6 | Example 7 | Example 8 |
|---|---|---|---|---|---|---|---|---|---|---|
| (c) Solvent | Material |  | TL | TL | TL | TL | TL | TL | TL | TL |
|  | Added amount (wt. part) |  | 78.6 | 78.6 | 78.6 | 78.6 | 78.6 | 78.6 | 78.6 | 91.62 |
| Solid concentration of stock solution (wt. %) |  |  | 20.6 | 20.6 | 20.6 | 20.6 | 20.6 | 20.6 | 20.6 | 8.0 |
| Dilution times | Coating | (i) | 10 | 10 | 10 | 10 | 10 | 10 | 10 | 4 |
| of stock |  | (ii) | 10 | 10 | 10 | 10 | 10 | 10 | 10 | 4 |
| solution (times) |  | (iii) | 50 | 50 | 50 | 50 | 50 | 50 | 50 | 20 |
|  |  | (iv) | 50 | 50 | 50 | 50 | 50 | 50 | 50 | 20 |
| Solid concentration | Coating | (i) | 2.06 | 2.06 | 2.06 | 2.06 | 2.06 | 2.06 | 2.06 | 2.01 |
| in coating (after |  | (ii) | 2.06 | 2.06 | 2.06 | 2.06 | 2.06 | 2.06 | 2.06 | 2.01 |
| dilution) (wt. %) |  | (iii) | 0.41 | 0.41 | 0.41 | 0.41 | 0.41 | 0.41 | 0.41 | 0.40 |
|  |  | (iv) | 0.41 | 0.41 | 0.41 | 0.41 | 0.41 | 0.41 | 0.41 | 0.40 |
| Evaluation | Thickness of | Coating (i) | 0.5 | 0.5 | 0.5 | 0.5 | 0.5 | 0.5 | 0.5 | 0.5 |
|  | surface | (ii) | 0.5 | 0.5 | 0.5 | 0.5 | 0.5 | 0.5 | 0.5 | 0.5 |
|  | treated layer | (iii) | 0.2 | 0.2 | 0.2 | 0.2 | 0.2 | 0.2 | 0.2 | 0.2 |
|  | (μm) | (iv) | 0.2 | 0.2 | 0.2 | 0.2 | 0.2 | 0.2 | 0.2 | 0.2 |
|  | Adhesion of | Coating (i) | ○ | ○ | ○ | ○ | ○ | ○ | ○ | ○ |
|  | surface | (ii) | ○ | ○ | ○ | ○ | ○ | ○ | ○ | ○ |
|  | treated layer | (iii) | ○ | ○ | ○ | ○ | ○ | ○ | ○ | ○ |
|  |  | (iv) | ○ | ○ | ○ | ○ | ○ | ○ | ○ | ○ |
|  | Cross | Coating (i) | ○ | ○ | ○ | ○ | ○ | ○ | ○ | ○ |
|  | cut |  (ii) | ○ | ○ | ○ | ○ | ○ | ○ | ○ | ○ |
|  | test | (iii) | ○ | ○ | ○ | ○ | ○ | ○ | ○ | ○ |
|  |  | (iv) | ○ | ○ | ○ | ○ | ○ | ○ | ○ | ○ |

TABLE 4

|  |  |  | Example 9 | Example 10 | Example 11 | Example 12 | Example 13 | Example 14 | Example 15 | Example 16 |
|---|---|---|---|---|---|---|---|---|---|---|
| Hydraulic transfer method |  |  | UV | UV | UV | UV | UV | UV | UV | UV |
| (a) Modified polyolefin | Material |  | A/C1 | A/C1 | A/C1 | A/C1 | A/C1 | A/C1 | A/C1 | A/C1 |
|  | Added amount (wt. part) |  | 20.3 | 20.2 | 20.0 | 18.5 | 17.0 | 15.7 | 14.6 | 13.6 |
| (b) Multifunctional isocyanate | trifunctional | Material | A | A | A | A | A | A | A | A |
|  |  | Added amount (wt. part) | 0.05 | 0.10 | 0.20 | 0.93 | 1.70 | 2.35 | 2.91 | 3.40 |
|  | bifunctional | Material | F | F | F | F | F | F | F | F |
|  |  | Added amount (wt. part) | 0.05 | 0.10 | 0.20 | 0.93 | 1.70 | 2.35 | 2.91 | 3.40 |
|  | tetra or more-functional | Material | — | — | — | — | — | — | — | — |
|  |  | Added amount (wt. part) | — | — | — | — | — | — | — | — |
|  | wt. ratio to (a) |  | 0.005 | 0.01 | 0.02 | 0.1 | 0.2 | 0.3 | 0.4 | 0.5 |
| (c) Solvent | Material |  | TL | TL | TL | TL | TL | TL | TL | TL |
|  | Added amount (wt. part) |  | 81.2 | 80.8 | 80.0 | 79.2 | 80.0 | 79.8 | 80.3 | 79.4 |
| Solid concentration of stock solution (wt. %) |  |  | 20.1 | 20.2 | 20.3 | 20.5 | 20.3 | 20.4 | 20.3 | 20.4 |
| Dilution times | Coating | (i) | 10 | 10 | 10 | 10 | 10 | 10 | 10 | 10 |
| of stock |  | (ii) | 10 | 10 | 10 | 10 | 10 | 10 | 10 | 10 |
| solution (times) |  | (iii) | 50 | 50 | 50 | 50 | 50 | 50 | 50 | 50 |
|  |  | (iv) | 50 | 50 | 50 | 50 | 50 | 50 | 50 | 50 |
| Solid | Coating | (i) | 2.01 | 2.02 | 2.03 | 2.05 | 2.03 | 2.04 | 2.03 | 2.04 |
| concentration in |  | (ii) | 2.01 | 2.02 | 2.03 | 2.05 | 2.03 | 2.04 | 2.03 | 2.04 |
| coating (wt. %) |  | (iii) | 0.40 | 0.40 | 0.41 | 0.41 | 0.41 | 0.41 | 0.41 | 0.41 |
|  |  | (iv) | 0.40 | 0.40 | 0.41 | 0.41 | 0.41 | 0.41 | 0.41 | 0.41 |
| Evaluation | Thickness of | Coating (i) | 0.5 | 0.5 | 0.5 | 0.5 | 0.5 | 0.5 | 0.5 | 0.5 |
|  | surface | (ii) | 0.5 | 0.5 | 0.5 | 0.5 | 0.5 | 0.5 | 0.5 | 0.5 |
|  | treated layer | (iii) | 0.2 | 0.2 | 0.2 | 0.2 | 0.2 | 0.2 | 0.2 | 0.2 |
|  | (μm) | (iv) | 0.2 | 0.2 | 0.2 | 0.2 | 0.2 | 0.2 | 0.2 | 0.2 |
|  | Adhesion of | Coating (i) | ○ | ○ | ○ | ○ | ○ | ○ | ○ | ○ |
|  | surface | (ii) | ○ | ○ | ○ | ○ | ○ | ○ | ○ | ○ |
|  | treated layer | (iii) | ○ | ○ | ○ | ○ | ○ | ○ | ○ | ○ |
|  |  | (iv) | ○ | ○ | ○ | ○ | ○ | ○ | ○ | ○ |
|  | Cross | Coating (i) | ○ | ○ | ○ | ○ | ○ | ○ | ○ | ○ |
|  | cut |  (ii) | ○ | ○ | ○ | ○ | ○ | ○ | ○ | ○ |
|  | test | (iii) | ○ | ○ | ○ | ○ | ○ | ○ | ○ | ○ |
|  |  | (iv) | ○ | ○ | ○ | ○ | ○ | ○ | ○ | ○ |

TABLE 5

| | | | Example 17 | Example 18 | Example 19 | Example 20 | Example 21 | Example 22 | Example 23 | Example 24 |
|---|---|---|---|---|---|---|---|---|---|---|
| Hydraulic transfer method | | | UV | UV | UV | UV | UV | UV | UV | UV |
| (a) Modified polyolefin | | Material | A/C1 | A/C1 | A/C1 | A/C1 | A/C1 | A/C1 | A/C1 | AM |
| | | Added amount (wt. part) | 19.4 | 19.4 | 19.4 | 19.4 | 19.4 | 19.4 | 19.4 | 7.25 |
| (b) Multifunctional isocyanate | trifunctional | Material | A | A | A | A | — | A | C | — |
| | | Added amount (wt. part) | 0.5 | 0.5 | 0.5 | 0.5 | — | 1.0 | 1.0 | — |
| | bifunctional | Material | F | F | F | F | G | — | — | H |
| | | Added amount (wt. part) | 0.5 | 0.5 | 0.5 | 0.5 | 1.0 | — | — | 0.5 |
| | tetra or more-functional | Material | — | — | — | — | — | — | — | — |
| | | Added amount (wt. part) | — | — | — | — | — | — | — | — |
| | | wt. ratio to (a) | 0.05 | 0.05 | 0.05 | 0.05 | 0.05 | 0.05 | 0.05 | 0.07 |
| (c) Solvent | | Material | TL | TL | TL | TL | TL | TL | TL | ECH |
| | | Added amount (wt. part) | 78.6 | 78.6 | 78.6 | 78.6 | 78.6 | 79.6 | 79.6 | 92.25 |
| Solid concentration of stock solution (wt. %) | | | 20.6 | 20.6 | 20.6 | 20.6 | 20.6 | 20.4 | 20.4 | 7.8 |
| Dilution times of stock solution (times) | Coating | (i) | — | 1.5 | — | 1.5 | 10 | 10 | 10 | 4 |
| | | (ii) | — | 1.5 | — | 1.5 | 10 | 10 | 10 | 4 |
| | | (iii) | 400 | — | 500 | — | 50 | 50 | 50 | 20 |
| | | (iv) | 400 | — | 500 | — | 50 | 50 | 50 | 20 |
| Solid concentration in coating (wt. %) | Coating | (i) | — | 13.74 | — | 13.74 | 2.06 | 2.04 | 2.04 | 1.94 |
| | | (ii) | — | 13.74 | — | 13.74 | 2.06 | 2.04 | 2.04 | 1.94 |
| | | (iii) | 0.05 | — | 0.04 | — | 0.41 | 0.41 | 0.41 | 0.39 |
| | | (iv) | 0.05 | — | 0.04 | — | 0.41 | 0.41 | 0.41 | 0.39 |
| Evaluation | Thickness of surface treated layer [μm] | (i) | — | 3 | — | 4 | 0.5 | 0.5 | 0.5 | 0.5 |
| | | (ii) | — | 3 | — | 4 | 0.5 | 0.5 | 0.5 | 0.5 |
| | | (iii) | 0.01 | — | 0.005 | — | 0.2 | 0.2 | 0.2 | 0.2 |
| | | (iv) | 0.01 | — | 0.008 | — | 0.2 | 0.2 | 0.2 | 0.2 |
| | Adhesion of surface treated layer | (i) | — | ○ | ○ | ○ | ○ | ○ | ○ | ○ |
| | | (ii) | — | ○ | ○ | ○ | ○ | ○ | ○ | ○ |
| | | (iii) | ○ | — | ○ | — | ○ | ○ | ○ | ○ |
| | | (iv) | ○ | — | ○ | — | ○ | ○ | ○ | ○ |
| | Cross cut test | (i) | — | ○ | — | Δ | ○ | ○ | ○ | ○ |
| | | (ii) | — | ○ | — | Δ | ○ | ○ | ○ | ○ |
| | | (iii) | ○ | — | Δ | — | ○ | ○ | ○ | ○ |
| | | (iv) | ○ | — | Δ | — | ○ | ○ | ○ | ○ |

TABLE 6

| | | | Example 25 | Example 26 | Example 27 | Example 28 | Comparative Example 1 | Comparative Example 2 | Comparative Example 3 |
|---|---|---|---|---|---|---|---|---|---|
| Hydraulic transfer method | | | UV | UV | UV | NOR | UV | UV | UV |
| (a) Modified polyolefin | | Material | AM | A/C3 | A/C1 | A/C1 | A/C1 | A/C1 | A/C1 |
| | | Added amount (wt. part) | 7.25 | 18.0 | 19.4 | 19.4 | 20.4 | 20.4 | 12.8 |
| (b) Multifunctional isocyanate | trifunctional | Material | D | A | — | A | — | A | A |
| | | Added amount (wt. part) | 0.375 | 0.5 | — | 0.5 | — | 0.02 | 3.8 |
| | bifunctional | Material | — | F | F | F | — | F | F |
| | | Added amount (wt. part) | — | 0.5 | 0.5 | 0.5 | — | 0.02 | 3.8 |
| | tetra or more-functional | Material | — | — | I | — | — | — | — |
| | | Added amount (wt. part) | — | — | 0.5 | — | — | — | — |
| | | wt. ratio to (a) | 0.05 | 0.06 | 0.05 | 0.05 | 0.0 | 0.002 | 0.6 |
| (c) Solvent | | Material | ECH | Xyl | TL | TL | TL | TL | TL |
| | | Added amount (wt. part) | 91.62 | 80 | 79.6 | 78.6 | 80.0 | 81.4 | 80.0 |
| Solid concentration of stock solution (wt. %) | | | 7.7 | 19.2 | 20.4 | 20.6 | 20.3 | 20.0 | 20.3 |
| Dilution times of stock solution (times) | Coating | (i) | 4 | 10 | 10 | 10 | 10 | 10 | 10 |
| | | (ii) | 4 | 10 | 10 | 10 | 10 | 10 | 10 |
| | | (iii) | 20 | 50 | 50 | 50 | 50 | 50 | 50 |
| | | (iv) | 20 | 50 | 50 | 50 | 50 | 50 | 50 |
| Solid concentration in coating (wt. %) | Coating | (i) | 1.92 | 1.92 | 2.04 | 2.06 | 2.03 | 2.00 | 2.03 |
| | | (ii) | 1.92 | 1.92 | 2.04 | 2.06 | 2.03 | 2.00 | 2.03 |
| | | (iii) | 0.38 | 0.38 | 0.41 | 0.41 | 0.41 | 0.40 | 0.41 |
| | | (iv) | 0.38 | 0.38 | 0.41 | 0.41 | 0.41 | 0.40 | 0.41 |
| Evaluation | Thickness of surface treated layer [μm] | (i) | 0.5 | 0.5 | 0.5 | 0.5 | 0.5 | 0.5 | 0.5 |
| | | (ii) | 0.5 | 0.5 | 0.5 | 0.5 | 0.5 | 0.5 | 0.5 |
| | | (iii) | 0.2 | 0.2 | 0.2 | 0.2 | 0.2 | 0.2 | 0.2 |
| | | (iv) | 0.2 | 0.2 | 0.2 | 0.2 | 0.2 | 0.2 | 0.2 |
| | Adhesion of surface treated layer | (i) | ○ | ○ | ○ | ○ | ○ | ○ | ○ |
| | | (ii) | ○ | ○ | ○ | ○ | ○ | ○ | ○ |
| | | (iii) | ○ | ○ | ○ | ○ | ○ | ○ | ○ |
| | | (iv) | ○ | ○ | ○ | ○ | ○ | ○ | ○ |

TABLE 6-continued

|  |  |  | Example 25 | Example 26 | Example 27 | Example 28 | Comparative Example 1 | Comparative Example 2 | Comparative Example 3 |
|---|---|---|---|---|---|---|---|---|---|
| Cross cut test | Coating | (i) | ○ | ○ | ○ | ○ | X | X | X |
|  |  | (ii) | ○ | ○ | ○ | ○ | X | X | X |
|  |  | (iii) | ○ | ○ | ○ | ○ | X | X | X |
|  |  | (iv) | ○ | ○ | ○ | ○ | X | X | X |

TABLE 7

|  | Comparative Example 4 | Comparative Example 5 | Comparative Example 6 | Comparative Example 7 | Comparative Example 8 |
|---|---|---|---|---|---|
| Hydraulic transfer method | UV | UV | UV | UV | UV |
| Primer | — | — | primer A | — | primer B |
| Thickness of Primer layer [μm] | — | 10 | 3 | 0.5 | 3 |
| Evaluation Tackiness of surface layer | — | x | x | x | x |
| Cross cut test | x | ○ | ○ | x | x |

As is clear from the above Tables 3 to 7, the surface treatment agent for hydraulic transfer of the present invention (Examples 1 to 28) is consisted of the modified polyolefin (a), the polyfunctional isocyanate (b) and the solvent (c), and is capable of forming a decorative layer having superior adhesion on the polyolefin-type substrate as an object to be transferred, by setting weight ratio (b/a) of the polyfunctional isocyanate (b) relative to the modified polyolefin (a) at 0.005 to 0.5.

In addition, in the surface treatment agent for hydraulic transfer of the present invention, superior adhesion was obtained by combined use of the bifunctional type and the trifunctional type (for example, in Example 1 or the like) as the polyfunctional isocyanate (b), or even by single use (Examples 17 to 20). Still more, superior adhesion was obtained by using any of the chlorinated polyolefin ($a^1$), the acid modified polyolefin ($a^2$), or the acid modified chlorinated polyolefin ($a^3$), as the modified polyolefin (a). It should be noted that in the cross-cut test of Examples 1 to 18 and Examples 21 to 28 (evaluation results [○]), number of squares peeled was 0 piece in all cases.

On the other hand, Comparative example 4 was the case where the decorative layer was formed on the polyolefin-type substrate, by hydraulic transfer without any surface treatment, and showed bad adhesion evaluation by the cross-cut test, as shown in Table 7.

In addition, from comparison between Examples 1 to 28 and Comparative Example 1, it has been understood that the surface treatment agent for hydraulic transfer consisting of the modified polyolefin (a) and the solvent (c) not including the polyfunctional isocyanate (b) is not capable of providing superior adhesion between the decorative layer and the polyolefin-type substrate, which is effect of the present invention, therefore, in order to obtain effect of the present invention, the modified polyolefin (a), the polyfunctional isocyanate (b) and the solvent (c) are essential compositional constituents.

In addition, from comparison of evaluation results between Example 9 and Comparative Example 2, as well as Example 16 and Comparative Example 3, it has been understood that outside of range of blending ratio of the modified polyolefin (a) and the polyfunctional isocyanate (b) specified by the present invention is not capable of providing superior adhesion between the decorative layer and the polyolefin-type substrate, which is effect of the present invention, therefore blending ratio of the modified polyolefin (a) and the polyfunctional isocyanate (b) is important.

In addition, Comparative Examples 5 to 8 are those where usual primer treatment was performed without using the surface treatment agent for hydraulic transfer of the present invention, and an adhering trouble of dust was generated because the treated layer had tackiness. Still more, as in Comparative Examples 5 and 6, primer treatment provides good adhesion for the case of a coating layer with a thickness of 3 μm or thicker, however, as in Comparative Example 4, superior adhesion was not obtained in the layer thickness below 3 μm.

However, in the surface treatment agent for hydraulic transfer of the present invention, for example, Example 1 or Example 2 has a thickness of the surface treatment layer in a range of 0.2 to 0.5 μm, and even when the thickness is thin, superior adhesion was obtained. In addition, as is understood from each comparison of, for example, Example 17 (a thickness of 0.01 μm) and Example 19 (a thickness of 0.005 μm), as well as Example 18 (a thickness of 3 μm) and Example 20 (a thickness of 4 μm), the thickness of the surface treatment layer below 0.01 μm and over 3 μm tends to decrease adhesion of the decorative layer to the polyolefin-type substrate, therefore, it has been understood that the thickness of the surface treatment layer is preferably in a range of 0.01 to 3 μm.

In addition, as a coating (treatment) method for the surface treatment agent for hydraulic transfer of the present invention to the polyolefin-type substrate, various methods can be applied such as wiping, spray coating, dipping, and in particular, in the case of forming a thin surface treatment layer, it has been understood that a method for air blowing after coating is effective.

Still more, as shown in Examples 24 and 25, it has been understood that superior adhesion was obtained even in the case of using the modified polyolefin (a) as the acid modified polyolefin, and using ethylcyclohexane, as a solvent, which has smaller environmental load than toluene (or xylene). In addition, although not described in Tables 5 and 6, it has been understood that the surface treatment agent for hydraulic transfer of Example 25 is advantageous for decreasing the environmental load because of no smell specific to an aromatic group, as compared with the surface treatment agent for hydraulic transfer of Example 24.

INDUSTRIAL APPLICABILITY

In the hydraulic transfer method relevant to the present invention, by using the surface treatment agent for hydraulic transfer of the present invention, because of superior adhesion between the polyolefin-type substrate and the decorative layer formed by hydraulic transfer, it is not required to perform a protective coating layer aiming at protection conventionally necessary, by which decrease in treatment steps or cost reduction is possible, in addition, the obtained hydraulic transfer products are capable of attaining superior design characteristics, productivity and low cost, because of superior adhesion between the polyolefin-type substrate and a decorative layer formed by hydraulic transfer and thus industrial applicability thereof is high.

REFERENCE SIGNS LIST 10 polyolefin-type substrate surface-treated with a surface treatment agent for hydraulic transfer
100 polyolefin-type substrate
11, 12 hydraulic transfer products
20, 21 transfer film for hydraulic transfer
30 water-soluble film
40 print pattern
41 transfer pattern
47 decorative layer
50 water
60 solvent-type activator
61 activation energy ray hardening-type activator (UV ray hardening-type activator)
70 water shower
71 warm air
72 irradiation of activation energy ray (UV irradiation)
80 topcoat (protective layer)
90 surface treatment layer

The invention claimed is:

1. A surface treatment agent for hydraulic transfer to a polyolefin-type substrate to be used in a hydraulic transfer method for forming a decorative layer, by coating an activator to a dried print pattern on a water-soluble film to recover adhesion of said print pattern, and then by hydraulic transferring said print pattern onto the surface of a surface treatment layer of the polyolefin-type substrate treated with the surface treatment agent,
characterized in that said surface treatment agent for hydraulic transfer is consisted of a resin composition comprising a modified polyolefin (a), a polyfunctional isocyanate (b) and a solvent (c), and a blending ratio of the polyfunctional isocyanate (b) relative to the modified polyolefin (a) is 0.005 to 0.5, in weight ratio, (b/a).

2. The surface treatment agent for hydraulic transfer according to claim 1, characterized in that the modified polyolefin (a) is at least one kind selected from the group consisting of a chlorinated polyolefin ($a^1$), an acid modified polyolefin ($a^2$), and an acid modified chlorinated polyolefin ($a^3$).

3. The surface treatment agent for hydraulic transfer according to claim 1, characterized in that the polyfunctional isocyanate (b) comprises a bifunctional isocyanate ($b^1$) and/or a trifunctional isocyanate ($b^2$).

4. The surface treatment agent for hydraulic transfer according to claim 3, characterized in that the bifunctional isocyanate ($b^1$) is an aromatic diisocyanate.

5. The surface treatment agent for hydraulic transfer according to claim 3, characterized in that the trifunctional isocyanate ($b^2$) is tris(isocyanatephenyl) thiophosphate or tris(isocyanatephenyl)methane.

6. The surface treatment agent for hydraulic transfer according to claim 2, characterized in that the modified polyolefin (a) is the acid modified polyolefin ($a^2$) and the polyfunctional isocyanate (b) is an aliphatic-type isocyanate.

7. The surface treatment agent for hydraulic transfer according to claim 1, characterized in that the solvent (c) is at least one kind selected from toluene, xylene, cycloalkanes or esters.

8. A hydraulic transfer method for forming a decorative layer, by coating an activator to a dried print pattern on a water-soluble film to recover adhesion of said print pattern, and then by hydraulic transferring said print pattern onto the surface of a surface treatment layer of the polyolefin-type substrate treated with the surface treatment agent,
characterized in that said surface treatment agent is consisted of a resin composition comprising a modified polyolefin (a), a polyfunctional isocyanate (b) and a solvent (c), and a blending ratio of the polyfunctional isocyanate (b) relative to the modified polyolefin (a) is 0.005 to 0.5, in weight ratio, (b/a), and thickness of said surface treatment layer is 3 μm or less.

9. The hydraulic transfer method according to claim 8, characterized in that the modified polyolefin (a) is at least one kind selected from the group consisting of the chlorinated polyolefin ($a^1$), the acid modified polyolefin ($a^2$), and the acid modified chlorinated polyolefin ($a^3$).

10. The hydraulic transfer method according to claim 8, characterized in that the polyfunctional isocyanate (b) comprises the bifunctional isocyanate ($b^1$) and/or the trifunctional isocyanate ($b^2$).

11. The hydraulic transfer method according to claim 10, characterized in that the bifunctional isocyanate ($b^1$) is the aromatic diisocyanate.

12. The hydraulic transfer method according to claim 10, characterized in that the trifunctional isocyanate ($b^2$) is tris(isocyanatephenyl) thiophosphate or tris(isocyanatephenyl) methane.

13. The hydraulic transfer method according to claim 9, characterized in that the modified polyolefin (a) is the acid modified polyolefin ($a^2$) and the polyfunctional isocyanate (b) is the aliphatic-type isocyanate.

14. The hydraulic transfer method according to claim 8, characterized in that the solvent (c) is at least one kind selected from toluene, xylene, cycloalkanes or esters.

15. The hydraulic transfer method according to claim 8, characterized in that treatment with the surface treatment agent is selected from wiping, spray coating or dipping treatment.

16. A hydraulic transfer product, characterized by being formed by the hydraulic transfer method according to claim 8.

* * * * *